(12) United States Patent
Meier

(10) Patent No.: US 6,990,090 B2
(45) Date of Patent: *Jan. 24, 2006

(54) RADIO FREQUENCY LOCAL AREA NETWORK

(75) Inventor: Robert C. Meier, Cuyahoga Falls, OH (US)

(73) Assignee: Broadcom Corporation, Irvine, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/162,229

(22) Filed: Jun. 4, 2002

(65) Prior Publication Data

US 2003/0091014 A1 May 15, 2003

Related U.S. Application Data

(63) Continuation of application No. 09/531,880, filed on Mar. 21, 2000, now Pat. No. 6,400,702, which is a continuation of application No. 09/089,950, filed on Jun. 3, 1998, now Pat. No. 6,084,867, and a continuation of application No. 08/494,909, filed on Jun. 26, 1995, now abandoned, which is a continuation-in-part of application No. 08/059,447, filed on May 7, 1993, now Pat. No. 5,428,636, and a continuation-in-part of application No. 08/056,827, filed on May 3, 1993, now Pat. No. 5,295,154, which is a continuation of application No. 07/769,425, filed on Oct. 1, 1991, now abandoned, said application No. 08/494,909, filed on Jun. 26, 1995, is a continuation-in-part of application No. 08/318,154, filed on Oct. 4, 1994, now abandoned, which is a continuation-in-part of application No. 08/238,090, filed on May 4, 1994, now abandoned, which is a continuation-in-part of application No. 08/177,738, filed on Jan. 4, 1994, now abandoned, which is a continuation-in-part of application No. 08/147,766, filed on Nov. 4, 1993, now abandoned, which is a continuation-in-part of application No. 08/073,142, filed on Jun. 4, 1993, now abandoned, which is a continuation-in-part of application No. 08/058,905, filed on May 6, 1993, now abandoned, and a continuation-in-part of application No. 09/072,791, filed on May 5, 1998, now Pat. No. 6,407,991, which is a continuation of application No. 08/780,124, filed on Dec. 26, 1996, now Pat. No. 5,748,619, and a continuation of application No. 08/318,154, filed on Oct. 4, 1994, now abandoned, which is a continuation-in-part of application No. 08/238,090, filed on May 4, 1994, now abandoned, which is a continuation-in-part of application No. 08/177,738, filed on Jan. 4, 1994, now abandoned, which is a continuation-in-part of application No. 08/147,766, filed on Nov. 4, 1993, now abandoned, which is a continuation-in-part of application No. 08/073,142, filed on Jun. 4, 1993, now abandoned, and a continuation-in-part of application No. 08/058,905, filed on May 6, 1993, now abandoned.

(51) Int. Cl.
*H04J 15/00* (2006.01)

(52) U.S. Cl. .................. 370/338; 370/277; 370/285; 370/329; 370/349; 370/401

(58) Field of Classification Search ............... 370/256, 370/277, 282, 285, 328, 329, 338, 349, 401, 370/402, 403, 404, 408
See application file for complete search history.

(56) References Cited

U.S. PATENT DOCUMENTS

| | | | | |
|---|---|---|---|---|
| 6,400,702 B1 | * | 6/2002 | Meier | 370/338 |
| 6,407,991 B1 | * | 6/2002 | Meier | 370/338 |
| 6,701,361 B1 | * | 3/2004 | Meier | 709/224 |
| 2001/0046223 A1 | * | 11/2001 | Malki et al. | 370/338 |

* cited by examiner

*Primary Examiner*—Dang Ton
*Assistant Examiner*—Shick Hom
(74) *Attorney, Agent, or Firm*—McAndrews, Held & Malloy, Ltd.

(57) ABSTRACT

An apparatus and a method for routing data in a radio data communication system having one or more host computers, one or more intermediate base stations, and one or more RF terminals organizes the intermediate base stations into an optimal spanning-tree network to control the routing of data to and from the RF terminals and the host computer efficiently and dynamically. Communication between the host computer and the RF terminals is achieved by using the network of intermediate base stations to transmit the data.

23 Claims, 9 Drawing Sheets

RADIO FREQUENCY LOCAL AREA NETWORK

CROSS REFERENCE TO RELATED APPLICATIONS

The present application is a continuation of application Ser. No. 09/531,880, filed Mar. 21, 2000, now U.S. Pat. No. 6,400,702, issued Jun. 4, 2002; which is a continuation of application Ser. No. 09/089,950, filed Jun. 3, 1998, now U.S. Pat. No. 6,084,867, issued Jul. 4, 2000; which is a continuation of application Ser. No. 08/494,909, filed Jun. 26, 1995, now abandoned; which is a continuation-in-part of application Ser. No. 08/059,447, filed May 7, 1993, now U.S. Pat. No. 5,428,636, issued Jun. 27, 1995; which is a continuation-in-part of application Ser. No. 08/056,827, filed May 3, 1993, now U.S. Pat. No. 5,295,154, issued Mar. 15, 1994; which itself is a continuation of the application Ser. No. 07/769,425, filed Oct. 1, 1991, now abandoned. Said application Ser. No. 08/494,909 is also a continuation-in-part of application Ser. No. 08/318,154, filed Oct. 4, 1994, now abandoned; which is a continuation-in-part of application Ser. No. 08/238,090, filed May 4, 1994, now abandoned; which is a continuation-in-part of application Ser. No. 08/177,738, filed Jan. 4, 1994, now abandoned; which is a continuation-in-part of application Ser. No. 08/147,766, filed Nov. 4, 1993, now abandoned; which is a continuation-in-part of application Ser. No. 08/073,142, filed Jun. 4, 1993, now abandoned; which is a continuation-in-part of application Ser. No. 08/058,905, filed May 6, 1993, now abandoned; the present application is also a continuation-in-part of application Ser. No. 09/072,791, filed May 5, 1998, now U.S. Pat. No. 6,407,991, issued Jun. 18, 2002; which is a continuation of application Ser. No. 08/780,124, filed Dec. 26, 1996, now U.S. Pat. No. 5,748,619, issued May 5, 1998, which is a continuation of application Ser. No. 08/318,154, filed Oct. 4, 1994, now abandoned; which is a continuation-in-part of application Ser. No. 08/238,090, filed May 4, 1994, now abandoned; which is a continuation-in-part of application Ser. No. 08/177,738, filed Jan. 4, 1994, now abandoned; which is a continuation-in-part of application Ser. No. 08/147,766, filed Nov. 4, 1993, now abandoned; which is a continuation-in-part of application Ser. No. 08/073,142, filed Jun. 4, 1993, now abandoned; which is a continuation-in-part of application Ser. No. 08/058,905, filed May 6, 1993, now abandoned.

AUTHORIZATION PURSUANT TO 37 C.F.R. 1.71(d) AND (e)

A portion of the disclosure of this patent document contains material which is subject to is copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

The Applicant hereby incorporates herein by reference in their entireties, including any and all figures and appendices, the following patent applications and patents: U.S. Pat. No. 5,295,154, issued Mar. 15, 1994, in the name of Robert C. Meier; U.S. Pat. No. 5,394,436, issued Feb. 28, 1995, in the names of Meier, et al., including Appendix A and Appendix B; PCT International Application PCT/US94/12742 of inventor Meier, including Appendix A and Appendix B, with an International filing date of Nov. 4, 1994, an International Publication Number of WO 95/12942 and an International Publication date of May 11, 1995; application Ser. No. 08/318,154, filed Oct. 4, 1994, including Appendix A; and abandoned application Ser. No. 07/769,425, filed Oct. 1, 1991, in the names of Meier, et al.

BACKGROUND OF THE INVENTION

In a typical radio data communication system having one or more host computers and multiple RF terminals, communication between a host computer and an RF terminal is provided by one or more base stations. Depending upon the application and the operating conditions, a large number of these base stations may be required to adequately serve the system. For example, a radio data communication system installed in a large factory may require dozens of base stations in order to cover the entire factory floor.

In earlier RF data communication systems, the base stations were typically connected directly to a host computer through multi-dropped connections to an Ethernet communication line. To communicate between an RF terminal and a host computer, in such a system, the RF terminal sends data to a base station and the base station passes the data directly to the host computer. Communicating with a host computer through a base station in this manner is commonly known as hopping. These earlier RF data communication systems used a single-hop method of communication.

In order to cover a larger area with an RF data communication system and to take advantage of the deregulation of the spread-spectrum radio frequencies, later-developed RF data communication systems are organized into layers of base stations. As in earlier RF data communications systems, a typical system includes multiple base stations which communicate directly with the RF terminals and the host computer. In addition, the system is also includes intermediate stations that communicate with the RF terminals, the multiple base stations, and other intermediate stations. In such a system, communication from an RF terminal to a host computer may be achieved, for example, by having the RF terminal send data to an intermediate station, the intermediate station send the data to a base station, and the base station send the data directly to the host computer. Communicating with a host computer through more than one station is commonly known as a multiple-hop communication system.

Difficulties often arise in maintaining the integrity of such multiple-hop RF data communication systems. The system must be able to handle both wireless and hard-wired station connections, efficient dynamic routing of data information, RF terminal mobility, and interference from many different sources.

The present invention also relates to a wireless and wired communication network used to maintain communication pathways among wireless communication devices and remote stations. As is well known, wired local area networks ("LANs"), such as ethernet utilizing coaxial or twisted pair cabling ("wiring"), provide communication among remote stations, such as personal or host computers, which are commonly wired to a wired LAN. Hereinafter, a wired LAN is referred to as a "wired subnet". To maintain communication beyond the wired range of ethernet, for example, bridging devices are employed to route information between one wired section of ethernet to another wired section. The bridging devices forward communication from one side of the bridging device onto the other, and vice versa. Smarter bridging devices are also known which keep track of the location of the remote stations so that forwarding only occurs when necessary.

As is also well known, in typical wireless communication networks, wireless communication generally occurs directly between two or more wireless terminals. To overcome transmission range limitations, such wireless networks have included wireless relaying transceivers to relay received communication, extending the range at which communication can be maintained. However, depending on the mode of wireless communication, many wireless relaying transceivers may be needed to adequately serve the network requirements.

In earlier wireless communication systems, the wireless relaying transceivers were also used to manage communication among a variety of wireless communication devices. Such relaying transceivers have been called base stations. The base station were typically connected directly to a host computer through multi-dropped connections to an ethernet communication line. To communicate between a wireless communication device and a host computer, in such a system, the wireless communication device sends data to a base station, and the base station passes the data along a hard-wired ("wired") link to the host computer.

In order to cover a larger area with a wireless communication system and to take advantage of the de-regulation of the spread-spectrum radio frequencies, later-developed wireless communication systems are organized into layers of base stations. As in earlier wireless communications systems, a typical system includes multiple base stations which communicate directly with wireless terminals and the host computer.

In such wireless networks, difficulties often arise in maintaining the integrity of wireless communications. The wireless communication network must be able to handle both wireless and wired connectivity, efficient routing of data information, wireless communication device mobility, and interference from many different sources.

Customarily, wired local area networks support wireless communication devices that occupy fixed locations. Message traffic to and from such devices are routed via paths that do not change with time. Absence of a communication link to a device reflects a fault condition, i.e., a breakdown in some network component.

Thus, one object of the present invention is to route data through a wired and wireless communication network efficiently, dynamically, and without looping.

Another object of the present invention is to make the routing of data transparent to wireless terminals and remote stations located on IEEE 802.3 type subnets.

It is a further object of the present invention for the network to be capable of handling wireless communication device mobility and lost network nodes with minimal impact on the entire data communication system.

It is a still further object of the invention to allow wireless mobile computing devices, a type of wireless communication device, to move freely within wireless networks consisting of many relay nodes while transparently maintaining network connectivity with a plurality of wired subnets.

SUMMARY OF THE INVENTION

The present invention solves many of the problems inherent in a multiple-hop data communication system. The present invention comprises an RF Local-Area Network capable of efficient and dynamic handling of data by routing communications between the RF Terminals and the host computer through a network of intermediate base stations.

In one embodiment of the present invention, the RF data communication system contains one or more host computers and multiple gateways, bridges, and RF terminals. Gateways are used to pass messages to and from a host computer and the RF Network. A host port is used to provide a link between the gateway and the host computer. In addition, gateways may include bridging functions and may pass information from one RF terminal to another. Bridges are intermediate relay nodes which repeat data messages. Bridges can repeat data to and from bridges, gateways and RF terminals and are used to extend the range of the gateways.

The RF terminals are attached logically to the host computer and use a network formed by a gateway and the bridges to communicate with the host computer. To set up the network, an optimal configuration for conducting network communication spanning tree is created to control the flow of data communication. To aid understanding by providing a more visual description, this configuration is referred to hereafter as a "spanning tree" or "optimal spanning tree".

Specifically, root of the spanning tree are the gateways; the branches are the bridges; and non-bridging stations, such as RF terminals, are the leaves of the tree. Data are sent along the branches of the newly created optimal spanning tree. Nodes in the network use a backward learning technique to route packets along the correct branches.

One object of the present invention is to route data efficiently, dynamically, and without looping. Another object of the present invention is to make the routing of the data transparent to the RF terminals. The RF terminals, transmitting data intended for the host computer, are unaffected by the means ultimately used by the RF Network to deliver their data.

It is a further object of the present invention for the network to be capable of handling RF terminal mobility and lost nodes with minimal impact on the entire RF data communication system.

The present invention also solves many of the foregoing problems by using a communication network comprising two wired subnets, a wired access point connected to each of the subnets, and a plurality of intermediate wireless access points. The plurality of intermediate wireless access points provide a wireless pathway between the wired access points connected to the two subnets. Together, the two wired access points and the plurality of intermediate wireless access points form a spanning tree which interconnects the two subnets.

In another embodiment of the invention, the network may also comprise a plurality of terminal nodes which utilize the wired access points and the plurality of intermediate wireless access points to communicate on the network.

In a further embodiment of the invention, the network may also comprise a remote station attached to each of the two wired subnets. The wired access points and the plurality of intermediate wireless access points maintain communication connectivity between the two remote stations. In addition, the network may further comprise a wireless communication device which utilizes the two wired access points and the plurality of intermediate wireless access points to communicate with the two remote stations.

In a still further embodiment, the network may also comprise a third subnet and a third wired access point connected thereto. The third wired access point participates in the spanning tree, and, along with the other two wired access points and the plurality of intermediate wireless access points, communicatively interconnects the three wired subnets. The network may also comprise a plurality of wireless communication devices which utilize the three wired access points and the plurality of intermediate wireless access points to communicate with the three subnets.

The full details of the subject invention will. become apparent from the following detailed description taken in conjunction with the drawings.

DETAILED DESCRIPTION OF THE INVENTION

Figure 1:
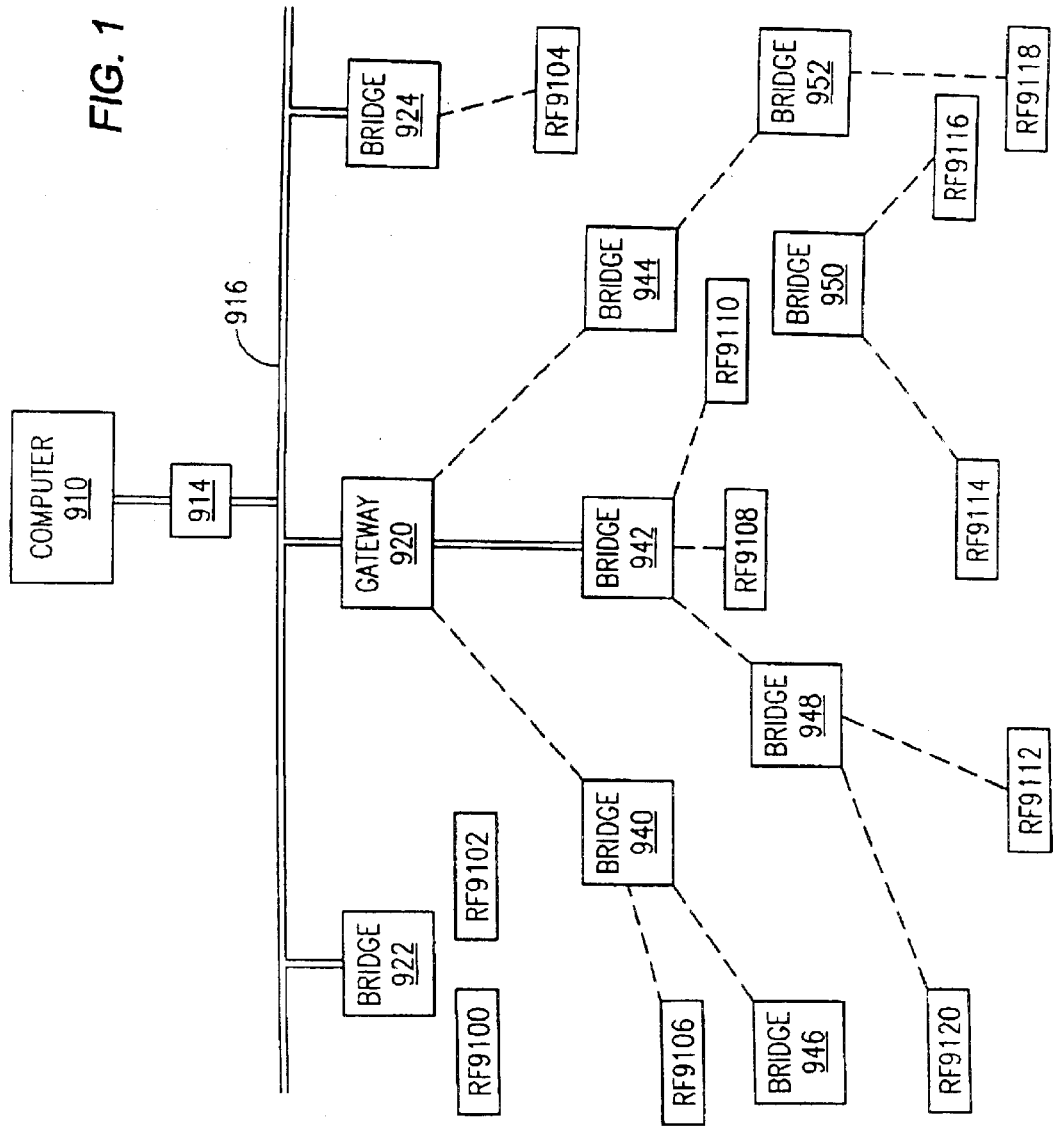
FIG. 1 is a functional block diagram of an RF data communication system incorporating the RF local-area network of the present invention.

FIG. 1 is a functional block diagram of an RF data communication system. In one embodiment of the present invention, the RF data communication system has a host computer 910, a network controller 914 and bridges 922 and 924 attached to a data communication link 916. Also attached to the data communication link 916 is a gateway 920 which acts as the root node for the spanning tree of the RF data network of the present invention. A bridge 942 is attached to the gateway 920 through a hard-wired communication link and bridges 940 and 944 are logically attached to gateway 920 by two independent RF links. Additional bridges 946, 948, 950 and 952 are also connected to the RF. Network and are shown in the FIG. 1. Note that, although shown separate from the host computer 910, the gateway 920 (the spanning tree root node) may be part of host computer 910.

FIG. 1 further shows RF terminals 9100 and 9102 attached to bridge 922 via RF links and RF terminal 9104 attached to bridge 924 via an RF link. Also, RF terminals 9106, 9108, 9110, 9112, 9114, 9116, 9118, and 9120 can be seen logically attached to the RF Network through their respective RF links. The RF terminals in FIG. 1 are representative of non-bridging stations. In alternate embodiments of the present invention, the RF Network could contain any type of device capable of supporting the functions needed to communicate in the RF Network such as hard-wired terminals, remote printers, stationary bar code scanners, or the like. The RF data communication system, as shown in FIG. 1, represents the configuration of the system at a discrete moment in time after the initialization of the system. The RF links, as shown, are dynamic and subject to change. For example, changes in the structure of the RF data communication system can be caused by movement of the RF terminals and by interference that affects the RF communication links.

In the preferred embodiment, the host computer 910 is an IBM 3090, the network controller 914 is a model RC3250 of the Norand Corporation, the data communication link 916 is an Ethernet link, the nodes 920, 922, 924, 940, 942, 944, 946, 948, 950 and 952 are intelligent base transceiver units of the type RB4000 of the Norand Corporation, and the RF terminals 9100, 9102, 9104, 9106, 9108, 9110, 9112, 9114, 9116, 9118 and 9120 are of type RT1100 of the Norand Corporation.

The optimal spanning tree, which provides the data pathways throughout the communication system, is stored and maintained by the network as a whole. Each node in the network stores and modifies information which specifies how local communication traffic should flow. Optimal spanning trees assure efficient, adaptive (dynamic) routing of information without looping.

To initialize the RF data communication system, the gateway 920 and the other nodes are organized into an optimal spanning tree rooted at the gateway 920. To form the optimal spanning tree, in the preferred embodiment the gateway 920 is assigned a status of ATTACHED and all other bridges are assigned the status UNATTACHED. The gateway 920 is considered attached to the spanning tree because it is the root node. Initially, all other bridges are unattached and lack a parent in the spanning tree. At this point, the attached gateway node 920 periodically broadcasts a specific type of polling packet referred to hereafter as "HELLO packets". The HELLO packets can be broadcast using known methods of communicating via radio frequency (RF) link or via a direct wire link. In the preferred embodiment of the present invention, the RF link is comprised of spread-spectrum transmissions using a polling protocol. Although a polling protocol is preferred, a carrier-sense multiple-access (CSMA), busy-tone, or any other protocol might also manage the communication traffic on the RF link.

HELLO packets contain 1) the address of the sender, 2) the hopping distance that the sender is from the root, 3) a source address, 4) a count of nodes in the subtree which flow through that bridge, and 5) a list of system parameters. Each node in the network is assigned a unique network service address and a node-type identifier to distinguish between different nodes and different node types. The distance of a node from the root node is measured in hops times the bandwidth of each hop. The gateway root is considered to be zero hops away from itself. The unattached bridges are in a LISTEN state. During the LISTEN state, a bridge will listen to the HELLO messages that are broadcast. By listening to the HELLO messages, bridges can learn which nodes are attached to the spanning tree. The unattached bridges analyze the contents of the HELLO messages to determine whether to request attachment to the broadcasting node. In the preferred embodiment, a bridge attempts to attach to the node that is logically closest to the root node. In the preferred embodiment, the logical distance is based upon the number of hops needed to reach the root node and the bandwidth of those hops. The distance the attached node is away from the root node is found in the second field of the HELLO message that is broadcast.

In another embodiment of the present invention, the bridges consider the number of nodes attached to the attached node as well as the logical distance of the attached node from the root node. If an attached node is overloaded with other attached nodes, the unattached bridge may request attachment to a less loaded node.

After attaching to an attached node, the newly attached bridge (the child) must determine its distance from the root node. To arrive at the distance of the child from the root node, the child adds the broadcast distance of its parent from the root node to the distance of the child from its parent. In the preferred embodiment, the distance of a child from its parent is based on the bandwidth of the data communication link. For example, if the child attaches to its parent via a hard-wired link (data rate 26,000 baud), then the distance of that communication link might equal, for example, one hop. However, if the child attaches to its parent via an RF link (data rate 9600 baud), then the distance of that communication link might correspondingly be equal 3 hops. The number of the hop corresponds directly to the communication speed of the link. This may not only take into consideration baud rate, but also such factors as channel interference.

Initially, only the root gateway node 920 is broadcasting HELLO messages and only nodes 940, 942 and 944 are within range of the HELLO messages broadcast by the gateway. Therefore, after the listening period has expired, nodes 940, 942 and 944 request attachment to the gateway node 920. The unattached nodes 940, 942 and 944 send ATTACH.request packets and the attached gateway node 920 acknowledges the ATTACH.request packets with local ATTACH.confirm packets. The newly attached bridges are assigned the status ATTACHED and begin broadcasting their own HELLO packets, looking for other unattached bridges. Again, the remaining unattached nodes attempt to attach to the attached nodes that are logically closest to the root node. For example, node 948 is within range of HELLO messages from both nodes 940 and 942. However, node 940 is three hops, via an RF link, away from the gateway root node 920 and node 942 is only one hop, via a hard-wired link, away from the gateway root node 920. Therefore, node 948 attaches to node 942, the closest node to the gateway root node 920.

The sending of HELLO messages, ATTACH.request packets and ATTACH.confirm packets continues until the entire spanning tree is established. In addition, attached bridges may also respond to HELLO messages. If a HELLO message indicates that a much closer route to the root node is available, the attached bridge sends a DETACH packet to its old parent and an ATTACH.request packet to the closer node. To avoid instability in the system and to avoid overloading any given node, an attached bridge would only respond to a HELLO message if the hop count in a HELLO packet is greater than a certain threshold value, CHANGE_THRESHOLD. In the preferred embodiment, the value of the CHANGE_THRESHOLD equals 3. In this manner, an optimal spanning tree is formed that is capable of transmitting data without looping.

Nodes, other than the gateway root node, after acknowledging an ATTACH.request packet from a previously unattached node, will send the ATTACH.request packet up the branches of the spanning tree to the gateway root node. As the ATTACH.request packet is being sent to the gateway root node, other nodes attached on the same branch record the destination of the newly attached node in their routing entry table. When the ATTACH.request packet reaches the gateway root node, the gateway root node returns an end-to-end ATTACH.confirm packet.

After the spanning tree is initialized, the RF terminals listen for periodically broadcasted Hello packets to determine which attached nodes are in range. After receiving HELLO messages from attached nodes, an RF terminal responding to an appropriate poll sends an ATTACH.request packet to attach to the node logically closest to the root. For example, RF terminal 9110 is physically closer to node 944. However, node 944 is three hops, via an RF link, away from the gateway root node 920 and node 942 is only one hop, via a hard-wired link, away from the gateway root node 920. Therefore, RF terminal 9110, after hearing HELLO messages from both nodes 942 and 944, attaches to node 942, the closest node to the gateway root node 920. Similarly, RF terminal 114 hears HELLO messages from nodes 948 and 950. Nodes 948 and 950 are both four hops away from the gateway root node 920. However, node 948 has two RF terminals 9110 and 9112 already attached to it while node 950 has only one RF terminal 9116 attached to it. Therefore, RF terminal 9114 will attach to node 950, the least busy node of equal distance to the gateway root node 920.

The attached node acknowledges the ATTACH.request and sends the ATTACH.request packet to the gateway root node. Then, the gateway root node returns an end-to-end ATTACH.confirm packet. In this manner, the end-to-end ATTACH.request functions as a discovery packet enabling the gateway root node, and all other nodes along the same branch, to learn the address of the RF terminal quickly. This process is called backward learning. Nodes learn the addresses of terminals by monitoring the traffic from terminals to the root. If a packet arrives from a terminal that is not contained in the routing table of the node, an entry is made in the routing table. The entry includes the terminal address and the address of the node that sent the packet. In addition, an entry timer is set for that terminal. The entry timer is used to determine when RF terminals are actively using the attached node. Nodes maintain entries only for terminals that are actively using the node for communication. If the entry timer expires due to lack of communication, the RF terminal entry is purged from the routing table.

The RF links among the RF terminals, the bridges, and the gateway are often lost. Therefore, a connection-oriented data-link service is used to maintain the logical node-to-node links. In the absence of network traffic, periodic messages are sent and received to ensure the stability of the RF link. As a result, the loss of a link is quickly detected and the RF Network can attempt to establish a new RF link before data transmission from the host computer to an RF terminal is adversely affected.

Communication between terminals and the host computer is accomplished by using the resulting RF Network. To communicate with the host computer, an RF terminal sends a data packet in response to a poll from the bridge closest to the host computer. Typically, the RF terminal is attached to the bridge closest to the host computer. However, RF terminals are constantly listening for HELLO and polling messages from other bridges and may attach to, and then communicate with, a bridge in the table of bridges that is closer to the particular RF terminal. Under certain operating conditions, duplicate data packets can be transmitted in the RF Network. For example, it is possible for an RF terminal to transmit a data packet to its attached node, for the node to transmit the acknowledgment frame, and for the RF terminal not to receive the acknowledgment. Under such circumstances, the RF terminal will retransmit the data. If the duplicate data packet is updated into the database of the host computer, the database would become corrupt. Therefore, the RF Network of the present invention detects duplicate data packets. To ensure data integrity, each set of data transmissions receives a sequence number. The sequence numbers are continuously incremented, and duplicate sequence numbers are not accepted.

When a bridge receives a data packet from a terminal directed to the host computer, the bridge forwards the data packet to the parent node on the branch. The parent node then forwards the data packet to its parent node. The forwarding of the data packet continues until the gateway root node receives the data packet and sends it to the host computer. Similarly, when a packet arrives at a node from the host computer directed to an RF terminal, the node checks its routing entry table and forwards the data packet to its child node which is along the branch destined for the RF terminal. It is not necessary for the nodes along the branch containing the RF terminal to know the ultimate location of the RF terminal. The forwarding of the data packet continues until the data packet reaches the final node on the branch, which then forwards the data packet directly to the terminal itself.

Communication is also possible between RF terminals. To communicate with another RF terminal, the RF terminal sends a data packet to its attached bridge. When the bridge receives the data packet from a terminal directed to the host computer, the bridge checks to see if the destination address of the RF terminal is located within its routing table. If it is, the bridge simply sends the message to the intended RF terminal. If not, the bridge forwards the data packet to its parent node. The forwarding of the data packet up the branch continues until a common parent between the RF terminals is found. Then, the common parent (often the gateway node itself) sends the data packet to the intended RF terminal via the branches of the RF Network.

During the normal operation of the RF Network, RF terminals can become lost or unattached to their attached node. If an RF terminal becomes unattached, for whatever reason, its routing entry is purged and the RF terminal listens for HELLO or polling messages from any attached nodes in range. After receiving HELLO or polling messages from attached nodes, the RF terminal sends an ATTACH.request packet to the attached node closest to the root. That attached node acknowledges the ATTACH.request and sends the ATTACH.request packet onto the gateway root node. Then, the gateway root node returns an end-to-end ATTACH.confirm packet.

Bridges can also become lost or unattached during normal operations of the RF Network. If a bridge becomes lost or unattached, all routing entries containing the bridge are purged. The bridge then broadcasts a HELLO.request with a global bridge destination address. Attached nodes will broadcast HELLO packets immediately if they receive an ATTACH.request packet with a global destination address. This helps the lost node re-attach. Then, the bridge enters the LISTEN state to learn which attached nodes are within range. The unattached bridge analyzes the contents of broadcast HELLO messages to determine whether to request attachment to the broadcasting node. Again, the bridge attempts to attach to the node that is logically closest to the root node. After attaching to the closest node, the bridge begins broadcasting HELLO messages to solicit ATTACH.requests from other nodes or RF terminals.

The spread-spectrum system provides a hierarchical radio frequency network of on-line terminals for data entry and message transfer in a mobile environment. The network is characterized by sporadic data traffic over multiple-hop data paths consisting of RS485 or ethernet wired links and single-channel direct sequenced spread spectrum links. The network architecture is complicated by moving, hidden, and sleeping nodes. The spread spectrum system consists of the following types of devices:

Terminal controller—A gateway which passes messages from a host port to the RF network; and which passes messages from the network to the host port. The host port (directly or indirectly) provides a link between the controller and a "host" computer to which the terminals are logically attached.

Base station—An intermediate relay node which is used to extend the range of the controller node. Base station-to-controller or base station-to-base station links can be wired or wireless RF.

Terminal—Norand RF hand-held terminals, printers, etc. In addition, a controller device has a terminal component.

The devices are logically organized as nodes in an (optimal) spanning tree, with the controller at the root, internal nodes in base stations or controllers on branches of the tree, and terminal nodes as (possibly mobile) leaves on the tree. Like a sink tree, nodes closer to the root of the spanning tree are said to be "downstream" from nodes which are further away. Conversely, all nodes are "upstream" from the root. Packets are only sent along branches of the spanning tree. Nodes in the network use a "BACKWARD LEARNING" technique to route packets along the branches of the spanning tree.

Devices in the spanning tree are logically categorized as one of the following three node types:

1) Root (or root bridge)—A controller device which functions as the root bridge of the network spanning tree. In the preferred embodiment, the spanning tree has a single root node. Initially, all controllers are root candidates from which a root node is selected. This selection may be based on the hopping distance to the host, preset priority, random selection, etc.

2) Bridge—An internal node in the spanning tree which is used to "bridge" terminal nodes together into an interconnected network. The root node is also considered a bridge and the term "bridge" may be used to refer to all non-terminal nodes or all non-terminal nodes except the root, depending on the context herein. A bridge node consists of a network interface function and a routing function.

3) Terminal—leaf node in the spanning tree. A terminal node can be viewed as the software entity that terminates a branch in the spanning tree.

A controller device contains a terminal node(s) and a bridge node. The bridge node is the root node if the controller is functioning as the root bridge. A base station contains a bridge node. A terminal device contains a terminal node and must have a network interface function. A "bridging entity" refers to a bridge node or to the network interface function in a terminal.

The basic requirements of the system are the following.
 a) Wired or wireless node connections.
 b) Network layer transparency.
 c) Dynamic/automatic network routing configuration.
 d) Terminal mobility. Terminals should be able to move about the RF network without losing an end-to-end connection.
 e) Ability to accommodate sleeping terminals.
 f) Ability to locate terminals quickly.

g) Built-in redundancy. Lost nodes should have minimal impact on the network.

h) Physical link independence. The bridging algorithm is consistent across heterogeneous physical links.

The software for the spread-spectrum system is functionally layered as follows.

Medium Access Control (MAC)

The MAC layer is responsible for providing reliable transmission between any two nodes in the network (i.e. terminal-to-bridge). The MAC has a channel access control component and a link control component. The link control component facilitates and regulates point-to-point frame transfers in the absence of collision detection. The MAC channel access control component regulates access to the network. Note that herein, the MAC layer is also referred to as the Data Link layer.

Bridging Layer

The bridging layer, which is also referred to herein as the network layer, has several functions as follows.

1. The bridging layer uses a "HELLO protocol" to organize nodes in the network into an optimal spanning tree rooted at the root bridge. The spanning tree is used to prevent loops in the topology. Interior branches of the spanning tree are relatively stable (i.e. controller and relay stations do not move often). Terminals, which are leaves on the spanning three, may become unattached, and must be reattached, frequently.

2. The bridging layer routes packets from terminals to the host, from the host to terminals, and from terminals to terminals along branches of the spanning tree.

3. The bridging layer provides a service for storing packets for SLEEPING terminals. Packets which cannot be delivered immediately can be saved by the bridging entity in a parent node for one or more HELLO times.

4. The bridging layer propagates lost node information throughout the spanning tree.

5. The bridging layer maintains the spanning tree links.

6. The bridging layer distributes network interface addresses.

Logical Link Control Layer

A logical link control layer, also known herein as the Transport layer herein, is responsible for providing reliable transmission between any two nodes in the network (i.e., terminal-to-base station). The data-link layer provides a connection-oriented reliable service and a connectionless unreliable service. The reliable service detects and discards duplicate packets and retransmits lost packets. The unreliable services provides a datagram facility for upper layer protocols which provide, a reliable end-to-end data path. The data-link layer provides ISO layer 2 services for terminal-to-host application sessions which run on top of an end-to-end terminal-to-host transport protocol. However, the data-link layer provides transport (ISO layer 4) services for sessions contained within the SST network.

Higher Layers

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer, as required. This document does not define (or restrict) those layers. This document does discuss a fast-connect VMTP-like transport protocol which is used for transient internal terminal-to-terminal sessions.

Specifically, a network layer has several functions, as follows.

1) The network layer uses a "hello protocol" to organize nodes in the network. into an optimal spanning tree rooted at the controller. (A spanning tree is required to prevent loops in the topology.) Interior branches of the spanning tree are relatively stable (i.e., the controller and base stations do not move often). Terminals, which are leaves on the spanning tree, become unattached, and must be reattached frequently.

2) The network layer routes messages from terminals to the host, from the host to terminals, and from terminals to terminals along branches of the spanning tree.

3) The network layer provides a service for storing messages for SLEEPING terminals. Messages which cannot be delivered immediately can be saved by the network entity in a parent node for one or more hello times.

4) The network layer propagates lost node information throughout the spanning tree.

5) The network layer maintains the spanning tree links in the absence of regular data traffic.

A transport layer is responsible for establishing and maintaining a reliable end-to-end data path between transport access points in any two nodes in the network. The transport layer provides unreliable, reliable and a transaction-oriented services. The transport layer should be immune to implementation changes in the network layer.

The responsibilities of the transport layer include the following.

1) Establishing and maintaining TCP-like connections for reliable root-to-terminal data transmission.

2) Maintaining VMTP-like transaction records for reliable transient message passing between any two nodes.

3) Detecting and discarding duplicate packets.

4) Retransmitting lost packets.

Layers 1 through 4 are self-contained within the Norand RF network, and are independent of the host computer and of terminal applications. The session layer (and any higher layers) are dependent on specific applications. Therefore, the session protocol (and higher protocols) must be implemented as required. Note that a single transport access point is sufficient to handle single sessions with multiple nodes. Multiple concurrent sessions between any two nodes could be handled with a session identifier in a session header.

Network address requirements are as follows. DLC framed contain a hop destination and source address in the DLC header. network packets contain is an end-to-end destination and a source address in the network header. Transport messages do not contain an address field; instead, a transport connection is defined by network layer source and destination address pairs. Multiple transport connections require multiple network address pairs.

The transport header contains a TRANSPORT ACCESS POINT identifier. DLC and network addresses are consistent and have the same format. Each node has a unique LONG ADDRESS which is programmed into the node at the factory. The long address is used only to obtain a SHORT ADDRESS from the root node.

The network entity in each node obtains a SHORT ADDRESS from the root node, which identifies the node uniquely. The network entity passes the short address to the DLC entity. Short addresses are used to minimize packet sizes.

Short addresses consist of the following. There is: an address length bit (short or long).

a spanning tree identified.

a node-type identifier. Node types are well known.

a unique multi-cast or broadcast node identifier.

The node-identifier parts of root addresses are well known and are constant. A default spanning tree identifier is well known by all nodes. A non-default spanning tree identifier can be entered into the root node (i.e., by a network administrator) and advertised to all other nodes in "hello" packets. The list of non-default spanning trees to which other nodes can attach must be entered into each node.

A node-type identifier of all 1's is used to specify all node types. A node identifier of all 1's is used to specify all nodes of the specified type. A DLC identifier of all 0's is used to specify a DLC entity which does not yet have an address. The all-0's address is used in DLC frames that are used to send and receive network ADDRESS packets. (The network entity in each node filters ADDRESS packets based on the network address.)

Short-address allocation is accomplished as follows. Short node identifiers of root nodes are well known. All other nodes must obtain a short node identifier from the root. To obtain a short address, a node send an ADDRESS request packet to the root node. The source addresses (i.e., DLC and network) in the request packet are LONG ADDRESSES. The root maintains an address queue of used and unused SHORT ADDRESSES. If possible, the root selects an available short address, associates the short address with the long address of the requesting node, and returns the short address to the requesting node in an ADDRESS acknowledge packet. (Note that the destination address in the acknowledge packet is a long address.)

A node must obtain a (new) short address initially and whenever an ADDRESS-TIMEOUT inactivity period expires without having the node receive a packet from the network entity in the root.

The network entity in the root maintains addresses in the address queue in least recently used order. Whenever a packet is received, the source address is moved to the end of the queue. The address at the head of the queue is available for use by a requesting node if it has never been used or if it has been inactive for a MAX-ADDRESS-LIFE time period.

MAX-ADDRESS-LIFE must be larger than ADDRESS-TIMEOUT to ensure that an address is not in use by any node when it becomes available for another node. If the root receives an ADDRESS request from a source for which an entry exists in the address queue, the root simply updates the queue and returns the old address.

The network layer organizes nodes into an optimal spanning tree with the controller at the root of the tree. (Note that the spanning three identifier allows two logical trees to exist in the same coverage area.) Spanning tree organization is facilitated with a HELLO protocol which allows nodes to determine the shortest path to the root before attaching to the spanning tree. All messages are routed along branches of the spanning tree.

Nodes in the network are generally categorized as ATTACHED or UNATTACHED. Initially, only the root node is attached. A single controller may be designated as the root, or multiple root candidates (i.e. controllers). may negotiate to determine which node is the root. Attached bridge nodes and root candidates transmit "HELLO" packets at calculated intervals. The HELLO packets include:

a) the source address, which includes the spanning tree ID).

b) a broadcast destination address.

c) a "seed" value from which the time schedule of future hello messages can be calculated.

d) a hello slot displacement time specifying an actual variation that will occur in the scheduled arrival of the very next hello message (the scheduled arrival being calculated from the "seed").

e) the distance (i.e., path cost) of the transmitter from the host. The incremental portion of the distance between a node and its parent is primarily a function of the type of physical link (i.e., ethernet, RS485, RF, or the like). If. a signal-strength indicator is available, connections are biased toward the link with the best signal strength. The distance component is intended to bias path selection toward (i.e., wired) high-speed connections. Setting a minimum signal strength threshold helps prevent sporadic changes in the network. In addition, connections can be biased to balance the load (i.e., the number of children) on a parent node.

f) a pending message list. Pending message lists consist of 0 or more destination-address/message-length pairs. Pending messages for terminals are stored in the terminal's parent node.

g) a detached-node list. Detached-node lists contain the addresses of nodes which have detached from the spanning tree. The root maintains two lists. A private list consists of all detached node addresses, and an advertised list consists of the addresses of all detached nodes which have pending transport messages. The addresses in the hello packet are equivalent to the advertised list.

An internal node learns which entries should be in its list from hello messages transmitted by its parent node. The root node builds its detached-node lists from information received in DETACH packets. Entries are included in hello messages for DETACH-MSG-LIFE hello times.

Attached notes broadcast "SHORT HELLO" messages immediately if they receive an "HELLO.request" packet with a global destination address; otherwise, attached nodes will only broadcast hello messages at calculated time intervals in "hello slots." Short hello messages do not contain a pending-message or detached-node list. Short hello messages are sent independently of regular hello messages and do not affect regular hello timing.

Unattached nodes (nodes without a parent in the spanning tree) are, initially, in an "UNATTACHED LISTEN" state. During the listen state, a node learns which attached base station/controller is closest to the root node by listening to hello messages. After the listening period expires an unattached node sends an ATTACH.request packet to the attached node closest to the root. The attached node immediately acknowledges the ATTACH.request, and send the ATTACH.request packet onto the root (controller) node. The root node returns the request as an end-to-end ATTACH-.confirm packet. If the newly-attached node is a base station, the node calculates its link distance and adds the distance to the distance of its parent before beginning to transmit hello messages.

The end-to-end ATTACH.request functions as a discovery packet, and enables the root node to learn the address of the source node quickly. The end-to-end ATTACH. request, when sent from a node to the root, does not always travel the entire distance. When a downstream node receives an ATTACH.request packet and already has a correct routing entry for the associated node, the downstream node intercepts the request and returns the ATTACH.confirm to the source node. (Note that any data piggy-backed on the ATTACH.request packet must still be forwarded to the host.) This situation occurs whenever a "new" path has more than one node in common with the "old" path.

The LISTEN state ends after MIN_HELLO hello time slots if hello messages have been received from at least one node. If no hello messages have been received the listening node waits and retries later.

An attached node may respond to a hello message from a node other than its parent (i.e., with an ATTACH.request) if the difference in the hop count specified in the hello packet exceeds a CHANGE-THRESHOLD level.

Unattached nodes may broadcast a GLOBAL ATTACH-.request with a multi-cast base station destination address to solicit short hello messages from attached base stations. The net effect is that the LISTEN state may (optionally) be shortened. (Note that only attached base station or the controller may respond to ATTACH. requests.) Normally, this facility is reserved for base stations with children and terminals with transactions in progress.

ATTACH. requests contain a (possibly empty) CHILD LIST, to enable internal nodes to update their routing tables. ATTACH.requests also contain a "count" field which indicates that a terminal may be SLEEPING. The network entity in the parent of a SLEEPING terminal con temporarily store messages for later delivery. If the count field is non-zero, the network entity in a parent node will store pending messages until 1) the message is delivered, or 2) "count" hello times have expired.

Transport layer data can be piggy-backed on an attached request packet from a terminal. (i.e., an attach request/confirm can be implemented with a bit flag in the network header of a data packet.)

Network Layer Routing.

All messages are routed along branches of the spanning tree. Base stations "learn" the address of terminals by monitoring traffic from terminals (i.e., to the root). When a base station receives (i.e., an ATTACH.request) packet, destined for the root, the base station creates or updates an entry in its routing table for the terminal. The entry includes the terminal address, and the address of the base station which sent the packet (i.e., the hop address). When a base station receives an upstream packet (i.e., from the root, destined for a terminal) the packet is simply forwarded to the base station which is in the routing entry for the destination. Upstream messages (i.e., to a terminal) are discarded whenever a routing entry does not exist. Downstream messages (i.e., from a terminal to the root) are simply forwarded to the next downstream node (i.e., the parent in the branch of the spanning tree.

TERMINAL-TO-TERMINAL COMMUNICATIONS is accomplished by routing all terminal-to-terminal traffic through the nearest common ancestor. In the worst case, the root is the nearest common ancestor. A "ADDRESS SERVER" facilitates terminal-to-terminal communications (see below).

DELETING INVALID ROUTING TABLE ENTRIES is accomplished in several ways: connection oriented transport layer ensures that packets will arrive from nodes attached to the branch of the spanning tree within the timeout period, unless a node is disconnected.)

2) Whenever the DLC entity in a parent fails RETRY MAX times to send a message to a child node, the node is logically disconnected from the spanning tree, with one exception. If the child is a SLEEPING terminal, the message is retained by the network entity in the parent for "count" hello times. The parent immediately attempts to deliver the message after it sends its next hello packet. If, after "count" hello times, the message cannot be delivered, then the child is logically detached from the spanning tree. Detached node information is propagated downstream to the root node, each node in the path of the DETACH packet must adjust its routing tables appropriately according to the following rules: a) if the lost node is a child terminal node, the routing entry for the terminal is deleted and a DETACH packet is generated, b) if the node specified in DETACH packet is a terminal and the node which delivered the packet is the next hop in the path to the terminal, then the routing table entry for the terminal is deleted and the DETACH packet is forwarded, c) if the lost node is a child base station node then all routing entries which specify that base station as the next hop are deleted and a DETACH packet is generated for each lost terminal.

IN GENERAL, WHENEVER A NODE DISCOVERS THAT A TERMINAL IS DETACHED, IT PURGES ITS ROUTING ENTRY FOR THE TERMINAL. WHENEVER A NODE DISCOVERS THAT A BASE STATION IS DETACHED, IT PURGES ALL ROUTING ENTRIES CONTAINING THE BASE STATION. ONLY ENTRIES FOR UPSTREAM NODES ARE DELETED.

When DETACH packets reach the root node, they are added to a "detached list." Nodes remain in the root node's detached list until a) the node reattaches to the spanning tree, or b) the list entry times out. The detached list is included in hello messages and is propagated throughout the spanning tree.

For example, if a terminal detaches and reattaches to a different branch in the spanning tree, all downstream nodes in the new branch (quickly) "learn" the new path to the terminal. Nodes which were also in the old path change their routing tables and no longer forward packets along the old path. At least one node, the root, must be in both the old and new path. A new path is established as soon as an end-to-end attach request packet from the terminal reaches a node which was also in the old path.

4) A node (quickly) learns that it is detached whenever it receives a hello message, from any node, with its address in the associated detached list. The detached node can, optionally, send a global ATTACH.request, and then enters the UNATTACHED LISTEN state and reattaches as described above. After reattaching, the node must remain in a HOLD-DOWN state until its address is aged out of all detached lists. During the HOLD-DOWN state the node ignores detached lists.

5) A node becomes disconnected and enters the UNATTACHED LISTEN state whenever HELLO-RETRY-MAX hello messages are missed from its parent node.

6) A node enters the ATTACHED LISTEN state whenever a single hello message, from its parent, is missed. SLEEPING terminals remain awake during the ATTACHED LISTEN state. The state ends when the terminal receives a data or hello message from its parent. The terminal becomes UNATTACHED when a) its address appears in the detached list of a hello message from an ode other than its parent, or b) HELLO-RETRY-MAX hello messages are missed. The total number of hello slots spend in the LISTEN state is constant.

If a node in the ATTACHED LISTEN state discovers a path to the root which is CHANGE-THRESHOLD shorter, it can attach to the shorter path. Periodically, SLEEPING terminals must enter the ATTACHED LEARN state to discovery any changes (i.e., shorter paths) in the network topology.

Hello Synchronization.

All attached non-terminal nodes broadcast periodic "hello" messages in discrete "hello slots" at calculated intervals. Base station nodes learn which hello slots are busy and refrain from transmitting during busy hello slots.

A terminal refrains from transmitting during the hello slot of its parent node and refrains from transmitting during message slots reserved in a hello message.

The hello message contains a "seed" field used in a well-known randomization algorithm to determine the next hello slot for the transmitting node and the next seed. The address of the transmitting node is used as a factor in the algorithm to guarantee randomization. Nodes can execute the algorithm i times to determine the time (and seed) if the i-the hello message from the transmitter.

After attached, a base station chooses a random initial seed and a non-busy hello slot and broadcasts a hello message in that slot. The base station chooses succeeding hello slots by executing the randomization algorithm. If an execution of the algorithm chooses a busy slot, the next free slot is used and a hello "displacement" field indicates the offset from a calculated slot. Cumulative delays are not allowed (i.e., contention delays during the i hello transmission do not effect the time of the i+1 hello transmission).

HELLO-TIME and HELLO-SLOT-TIME values are set by the root node and flooded throughout the network in hello messages. The HELLO-SLOT-TIME value must be large enough to minimize hello contention.

A node initially synchronizes on a hello message from its parent. A SLEEPING node can power-down with an active timer interrupt to wake it just before the next expected hello message. The network entity in base station nodes can store messages for SLEEPING nodes and transmit them immediately following the hello messages. This implementation enables SLEEPING terminals to receive unsolicited messages. (Note that the network layer always tries to deliver messages immediately, before storing them.) Retries for pending messages are transmitted in a round-robin order when messages are pending for more than one destination.

Note that a child node that misses i hello messages, can calculate the time of the i+1 hello message.

Transport Layer Theory and Implementation Notes.

The transport layer provides reliable, unreliable, and transaction-oriented services. Two types of transport connections are defined: 1) a TCP-like transport connection may be explicitly requested for long-lived connections or 2) a VMTP-like connection-record may be implicitly set up for transient connections. In addition, a connectionless service is provided for nodes which support an end-to-end transport connection with the host computer.

The interfaces to the next upper (i.e., application) layer include:
CONNECT (access_point, node_name)
LISTEN (access_point)
UNITDATA (access_point, node_name, buffer, length)
SEND (handle, buffer, length)
RECEIVE (handle, buffer, length)
CLOSE (handle)

The "handle" designates the connection type, and is the connection identifier for TCP-like connections.

SEND messages require a response from the network node (root or terminal) to which the message is directed.

UNITDATA messages do not require a response. UNITDATA is used to send messages to a host which is capable of supporting end-to-end host-to-terminal transport connections.

Because the network layer provides an unreliable service, the transport layer is required to detect duplicate packets and retransmit lost packets. Detecting duplicates is facilitated by numbering transport packets with unambiguous sequence numbers.

Transport Connections.

TCP-like transport connections are used for message transmission over long-lived connections. The connections may be terminal-to-root or terminal-to-terminal (i.e., base stations are not involved in the transport connection).

TCP-like transport connections are established using a 3-way handshake. Each end selects its initial sequence number and acknowledges the other end's initial sequence number during the handshake. The node which initiates the connection must wait a MAX-PACKET-LIFE time, before requesting a connection, to guarantee that initial sequence numbers are unambiguous. Sequence numbers are incremented modulo MAX-SEQ, where MAX-SEQ is large enough to insure that duplicate sequence numbers do not exist in the network. Packet types for establishing and breaking connections are defined as in TCP.

A TCP-like connection is full-duplex and a sliding window is used to allow multiple outstanding transport packets. An ARQ bit in the transport header is used to require an immediate acknowledgment from the opposite end.

VMTP-like connections are used for transient messages (i.e. terminal-to-terminal mail messages). VMTP-like connection records are built automatically. A VMTP-like connection record is built (or updated) whenever a VMTP-like transport message is received. The advantage is that an explicit connection request is not required. The disadvantage is that longer and more carefully selected sequence numbers are required. A VMTP-like connection is half-duplex. (A full-duplex connection at a higher layer can be built with two independent half-duplex VMTP-like connections.) Acknowledgments must be handled by higher layers.

Transport connections are defined by the network end-to-end destination and source addresses.

A MAX_TP_LIFE timeout is associated with transport connections. Transport connection records are purged after a MAX_TP_LIFE time expires without activity on the connection. The transport entity in a terminal can ensure that its transport connection will not be lost by transmitting an empty time-fill transport packet whenever TP_TIMEOUT time expires without activity.

The transport entity in a node stores messages for possible retransmission. Note that retransmissions may not always follow the same path (primarily) due to moving terminals and the resulting changes in the spanning tree. For example, the network entity in a parent node may disconnect a child after the DLC entity reports a message delivery failure. The child will soon discover that it is detached and will reattach to the spanning tree. Now when the transport entity (i.e. in the root) re-sends the message, it will follow the new path.

Transport Message Timing and Sleeping Terminals.

The transport entity in a terminal calculates a separate timeout for SEND and TRANSACTION operations. Initially, both timeouts are a function of the distance of the terminal from the root node.

A TCP-like algorithm is used to estimate the expected propagation delay for each message type. Messages, which require a response, are retransmitted if twice the expected propagation time expires before a response is received. SLEEPING terminals can power down for a large percentage of the expected propagation delay before waking up to receive the response message. Note that missed messages may be stored by the network layer for "count" hello times.

Medium Access Control (MAC) Theory and Implementation Notes.

Access to the network communications channel is regulated in several ways: executing the full CSMA algorithm (see MAC layer above). The sender retransmits unacknowledged messages until a RETRY_MAX count is exhausted.

The retry time of the DLC must be relatively short so that lost nodes can be detected quickly. When the DLC layer reports a failure to deliver a message to the network layer, the network layer can 1) save messages for SLEEPING terminals for later attempts, or 2) DETACH the node from the spanning tree. Note that most lost nodes are due to moving terminals.

The node identifier part of the DLC address is initially all 0's for all nodes except the root node. The all 0's address is used by a node to send and received data-link frames until a unique node identifier is passed to the DLC entity in the node. (The unique node identifier is obtained by the network entity.)

Address Resolution.

Well-known names too are bound to network addresses in several ways:

The network address and TRANSPORT ACCESS ID of a name server, contained in the root, is well-known by all nodes.

A node can register a well-known name with the name server contained in the root node.

A node can request the network access address of another application from the name server by using the well-known name of the application.

Possible Extensions.

Base station-to-base station traffic could also be routed through the controller if the backward learning algorithm included base station nodes. (Each base station would simply have to remember which direction on its branch of the spanning tree to send data directed toward another base station.)

The possibility of multiple controllers is kept open by including a spanning-tree identifier in address fields. Each controller defines a unique spanning tree. A node can be in more than one spanning tree, with separate network state variables defined for each.

Appendix A attached hereto as filed, but not being published as part of the patent to be granted hereon, is a Master's Degree thesis entitled "Mobile Computer Network Architecture" by the Applicant and contains additional disclosure on the subject matter of this application. Appendix A is hereby incorporated herein by reference in its entirety by reference to Appendix A as published in parent Meier U.S. Pat. No. 6,400,702 issued Jun. 4, 2002, at col. 27 through col. 196, and is also available in the file of the present application.

Thus, the preferred embodiment of the present invention describes an apparatus and a method of efficiently routing data through a network of intermediate base stations in a radio data communication system.

In alternate embodiments of the present invention, the RF Networks contain multiple gateways. By including a system identifier in the address field of the nodes, it is possible to determine which nodes are connected to which networks.

Figure 2:
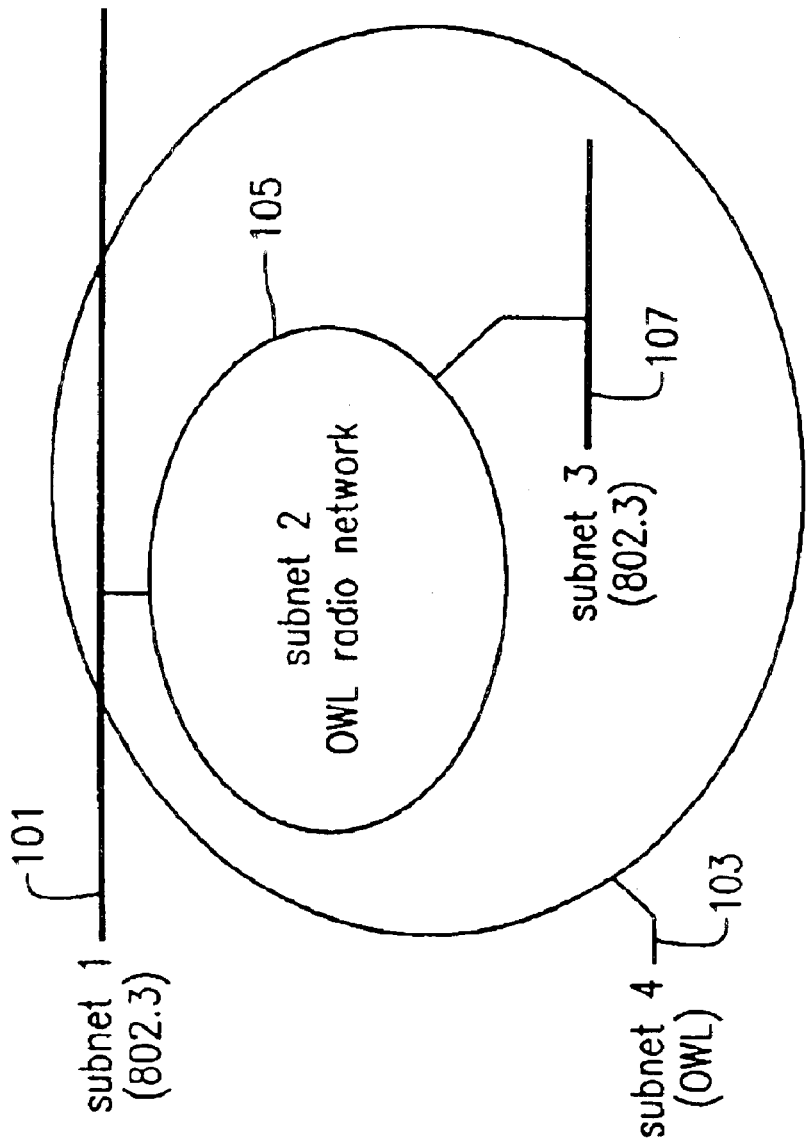
FIG. 2 illustrates the overall open wireless local area network (OWL) architecture according to the present invention.

FIG. 2 illustrates the overall open wireless local area network (OWL) architecture according to the present invention. Specifically, per IEEE (Institute of Electrical and Electronic Engineers) 802.3 Wired Local Area Network (LAN) Specifications, two subnets, a wired subnet 101 and a remote, wired subnet 107 are illustrated. The subnets 101 and 107 are wired LAN's built in accordance with the IEEE 802 specifications. According to the present invention, a third subnet, a wireless subnet 105, transparently interconnects the wired subnets 101 and 107. The wireless subnet 105 is referred to herein as an OWL radio network. Moreover, for reference herein, the wireless subnet 105 and the remote, wired subnet 107, together are referred to as an OWL subnet 103. Although, the wired subnet 101 is not part of the OWL subnet 103, it constitutes a distribution LAN for the OWL subnet 103.

Depending on the specific implementation, an OWL radio network can function (i) as a stand-alone LAN to support wireless communication between wireless communication devices, (ii) as a wireless subnet to a wired LAN to provide wireless access to and between wireless communication devices, (iii) as a wireless subnet to a wired LAN to provide access to remote wired subnets, or (iv) as a wireless subnet to a wired LAN to provide access between the wired LAN, remote wired subnets and wireless communication devices. For example, as illustrated, the wireless subnet 105 provides for communication between the wired subnet 101, the remote subnet 107, and wireless communication devices (not shown in FIG. 2) within the wireless subnet 105.

Figure 3:
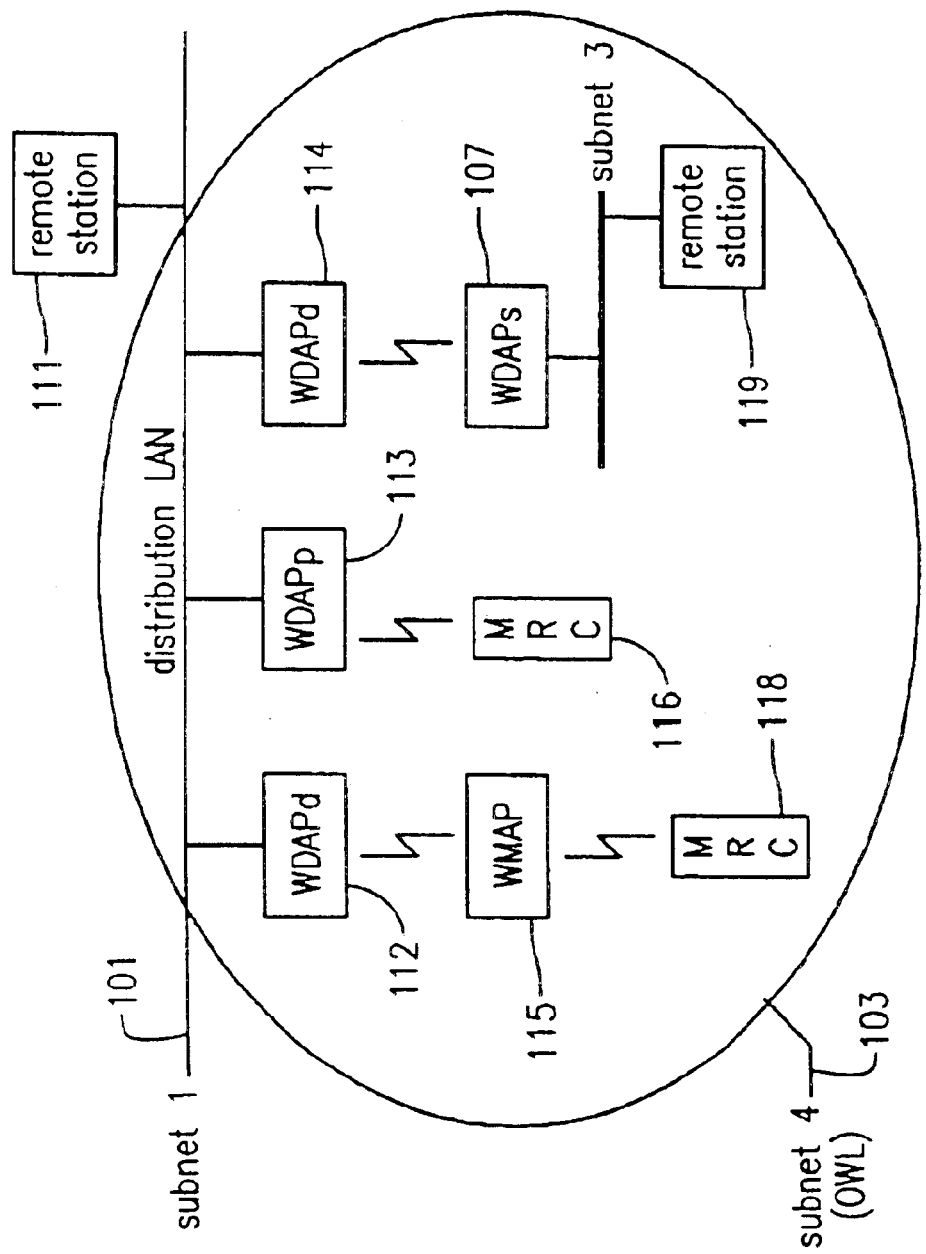
FIG. 3 shows an exemplary expanded configuration of FIG. 2, providing additional detail of the OWL radio network.

FIG. 3 shows an exemplary expanded configuration of FIG. 2, providing additional detail of the OWL radio network, the wireless subnet 105. The wireless subnet 105 provides access to the wired subnet 101, the remote wired subnet 107, and wireless communication devices, such as mobile radio-equipped computers (MRCs) 116 and 118. Other types of wireless communication devices include, but are not limited to, radio-equipped printers or other peripherals, stationary radio-equipped computers, pagers, etc. In addition, although radio frequency wireless communication is a preferred embodiment, other forms of wireless communication, such as infrared transmissions, might also be used.

The OWL radio network, such as the wireless subnet 105, provides for wireless transparent bridging via several types of wireless domain access points. In particular, each OWL subnet has a single primary wireless domain access point (WDAPp), such as the WDAPp 113. The WDAPp provides a single control point for the OWL subnet 103. The WDAPp 113 has direct access to the distribution LAN, i.e., the wired subnet 101. The WDAPp 113 forwards information, packaged in frames per IEEE 802 specification (hereinafter "802 frames"), between the wired subnet 101 and the wireless subnet 103.

In addition to a WDAPp, the OWL radio network may also be configured with one or more distributed wireless domain access points. As does the WDAPp, a distributed wireless domain access point (WDAPd) provides direct access to the wired subnet 101. However, each WDAPd in the network exists within the domain of its control point, the WDAPp. For example, as illustrated, within the domain of the WDAPp 113, a WDAPd 112 and a WDAPd 114 can be found. The WDAPd 112 and the WDAPd 114 forwards 802 frames between the wired subnet 101 and the OWL subnet 103.

As previously stated, an OWL subnet may also include wired subnets other than, and remotely located from, the distribution LAN, i.e., the wired subnet 101. For example, the wired subnet 107 represents one such remote wired subnets. Although only one is illustrated, many such remote wired subnets may exist in an OWL subnet 103.

Associated with each remote wired subnets, a secondary wireless domain access point (WDAPs) can be found. Each WDAPs serves as a bridge between a remote wired subnet and the OWL radio network. For example, a WDAPs 117 serves as a bridge between the remote wired subnet 107 and the wireless subnet 105. Thus, the WDAPs 117 forwards 802 frames between the remote wired subnet 107 and the wireless subnet 105.

As illustrated, a remote station 119 directly participates in the remote wired subnet 107 in conformance with IEEE 802 specifications. A remote station 111 similarly participates in the wired subnet 101. Each of the remote stations and wireless communication devices constitute "network nodes" in the OWL architecture. Moreover, any network node can freely communicate with any other network node. For example, the remote station 111 can freely intercommunicate with the remote station 119, MRC 116 and MRC 118.

Similarly, the MRC 116 can communicate with the MRC 118 and the remote stations 111 and 119.

Wireless media access points are also used in the OWL radio network where needed. A wireless media access point (WMAP), such as a WMAP 115, is a radio equipped base station which extends the s wireless coverage area of a OWL radio network, such as the wireless radio network 103, to support larger wireless coverage areas than might be desirable without the use of one or more WMAP's. A typical OWL radio network has multiple WMAP's with overlapping coverage areas. Thus, MRC's can roam between coverage areas and maintain network connectivity.

Similarly, communication need not always flow through the WDAPp 113. For example, the WDAPp 113 does not participate in the communication pathway between the MRC 118 and the remote station 119. The MRC 118 forwards communication destined for the remote station 119 downstream, toward the WDAPp 113. The WMAP 115 receives the communication, identifies no entry for the remote station 119 and, therefore, forwards the received communication downstream. The WDAPd 112 receives the communication, but does not find a routing table entry for the remote station 119. Thus, the WDAPd 112 converts the received communication into 802 frame(s) for forwarding outside of the radio network onto the wired subnet 101, i.e., upstream. The WDApd 114 hears the 802 frame(s), identifies a routing table entry for the remote station 119, converts the 802 frame(s) for wireless transmission, and forwards the communication upstream. The WDAPs 117 receives the wireless communication, and bridges the communication onto the wired subnet 107 in the form of 802 frame(s). The remote station 119 receives the 802 frame(s), completing the transfer without participation from the WDAPp 113.

Figure 4:
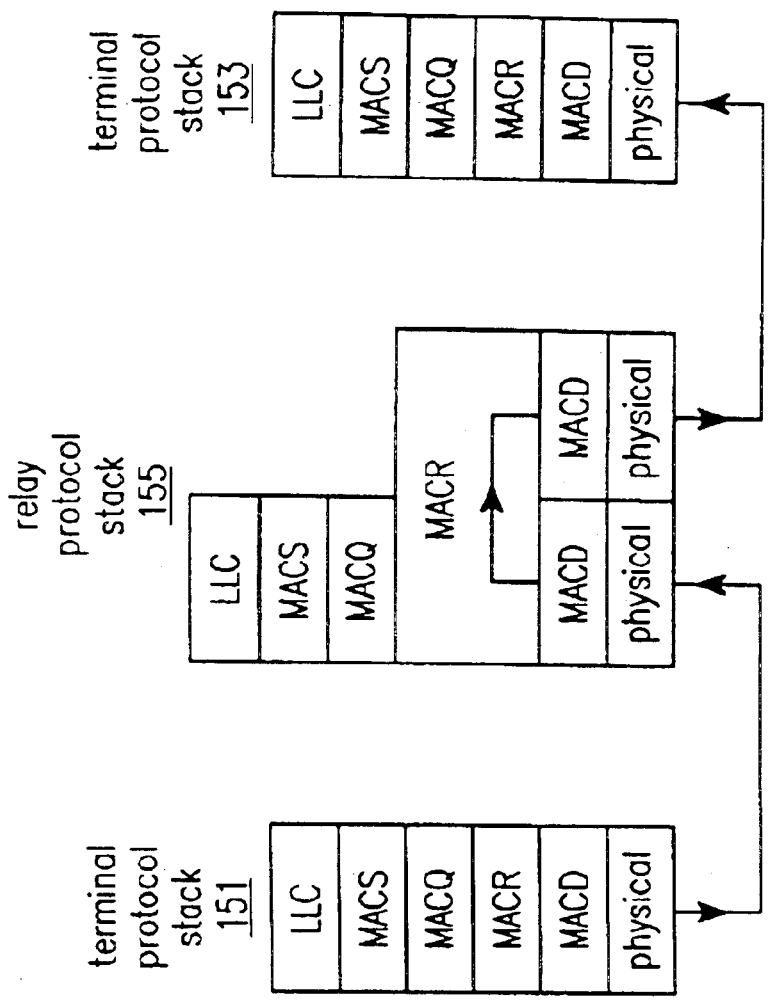
FIG. 4 illustrates the MAC protocol stacks used in an exemplary configuration of the present invention to provide for communication between two terminal nodes via a relay node.
Figure 5:
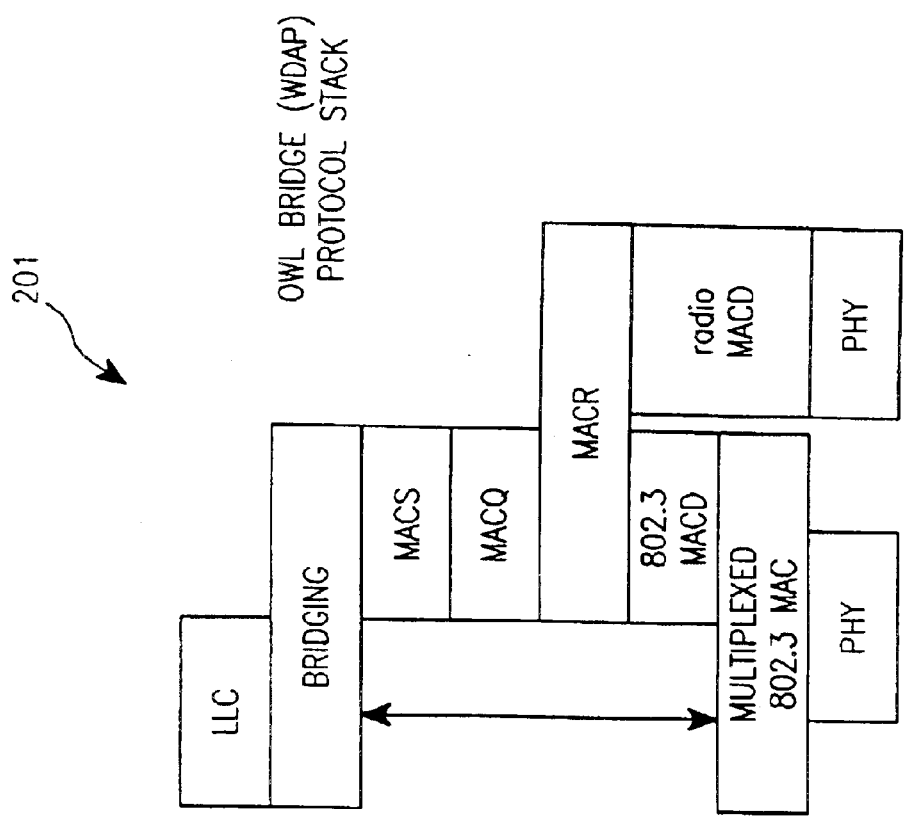
FIG. 5 illustrates an OWL bridge protocol stack used by each wireless domain access point (WDAP), an OWL bridge, to bridge the OWL radio network with an 802 type wired subnet, in an embodiment according to the present invention.
Figure 6:
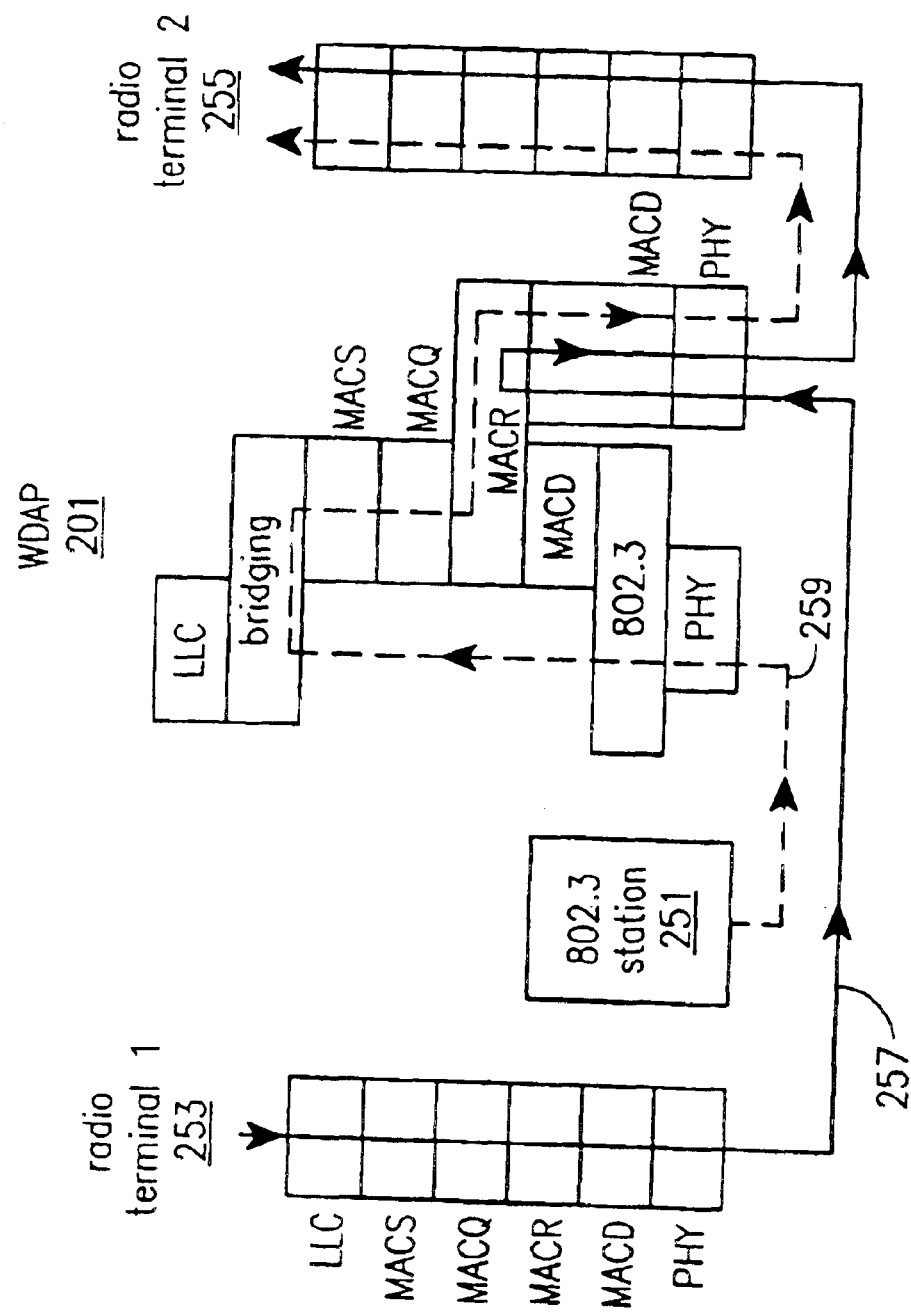
FIG. 6 is a data flow diagram illustrating how data flows through the bridge protocol stack of FIG. 5.

FIGS. 4–6. illustrates OWL protocol stacks according to the present invention which are contained in the MAC sub layer of a standard ISO protocol stack. In particular, an OWL MAC provides MAC sub layer services to the LLC sublayer of the ISO data link layer. The OWL MAC is subdivided into MAC-D, MAC-R, MAC-Q and MAC-S subiayers. The MAC-D sublayer is analogous to the data link layer in the ISO protocol stack. The MAC-D layer provides data link services to the MAC-R layer. It is responsible for channel access control and the reliable transmission of MAC-R PDU's. The MAC-R sublayer is analogous to the network layer in the ISO protocol stack. The MAC-R layer provides routing services to the. MAC-Q layer. It is responsible for correctly routing information through the OWL subnet, which may include multiple hops and circular physical paths. Such information is formatted into MAC-R protocol data units (PDUs) for routing. The MAC-Q sublayer adds reliability to the radio network by retransmitting lost PDUs. The MAC-Q layer is responsible for discarding out-of-sequence and duplicate PDUS. The MAC-Q sublayer can be implemented as an entity in the MAC-R sublayer. The MAC-Q entities exist at entry points to the radio network. The MAC-S sublayer is responsible for providing services for security, compression, etc. The MAC-S entities exist at entry points to the OWL radio network.

As referred to herein, logical OWL nodes are MAC-R addressable entities in the OWL radio network. The logical OWL nodes functional entities which can be contained within the various network devices. A logical OWL node can be either a terminal node or a relay node. The terminal nodes are end points in the network. The MRC's 116 and 117 contain terminal nodes, i.e., an MRC contains the logical functionality of a terminal node. Relay nodes forward PDUs at the MAC-R sublayer. The WMAP 115, for example, contains a relay node.

FIG. 4 illustrates the MAC protocol stacks used in an exemplary configuration to provide for communication between two terminal nodes via a relay node. Each terminal node in the network contains a terminal protocol stack which defines the terminal node as a network end-point. Each relay node in the network also contains a protocol stack, the "relay protocol stack" which defines the relay node as a PDU forwarding entity.

For example, as illustrated, two terminal nodes may communicate with each other via a relay node. The arrows shown represent the flow of data from a first terminal node (using a terminal protocol stack 151) to a second terminal node (using a terminal protocol stack 153) via a relay node (using a relay protocol stack 155). The upper layers of the relay protocol stack 155 are used to process PDUs addressed to the relay node.

FIG. 5 illustrates another type of protocol stack used in the network. An OWL bridge protocol stack 201 is illustrated which is used by each wireless domain access point (WDAP), an OWL bridge, to bridge a wireless subnet to an 802 type wired subnet. Each bridge protocol stack, such as bridge protocol stack 201, contains a relay protocol stack. In addition, the 802.3 MAC-D sublayer is used to send OWL PDUs over an 802.3 link that is part of the OWL radio network. The MAC-Q and MAC-S sublayers serve as proxy MAC-Q and MAC-S entities for stations, such as the remote stations 111 and 119 (FIG. 1), on the 802.3 subnet. For convenience, the MAC-Q and MAC-S sublayers also service PDUs for the local WDAP 802 address.

FIG. 6 illustrates how data flows through the bridge protocol stack of FIG. 5. A dashed line 259 represents the path a PDU takes as it travels from a station 251 on an 802.3 LAN to a terminal 255 in the OWL radio network. A WDAP, using the bridge protocol stack 201, bridges the PDU from the 802.3 subnet to the radio subnet. A solid line 257 represents the path a PDU takes as it travels from a terminal 253 to the terminal 255 wherein both terminals are in the radio network. In this example, because the path is contained in the radio network, the PDU does not have to be bridged.

In general, PDUs are bridged across subnet boundaries, and PDUs are routed within the radio network. A bridging entity in a WDAP uses a forwarding database to determine if a PDU should be bridged from one subnet to another subnet. A forwarding database contains a list of 802 addresses associated with each subnet to which the WDAP is attached. A MAC-R entity uses a routing table to determine how a PDU should be routed within an OWL subnet.

Further detail regarding this embodiment can be found in Appendices B and C, which were attached with the present application as filed, but are not being published as part of the patent to be granted hereon. Appendix B provides further detail regarding the OWL network architecture, while Appendix C describes the network frame formats used in communication exchanges. Appendices B and C are hereby incorporated herein by reference in their entireties by reference to Appendices B and C as published in parent Meier U.S. Pat. No. 6,400,702 issued Jun. 4, 2002, at cols 197–248, and at cols. 249–272, respectively, and are also available in the file of the present application.

Figure 7:
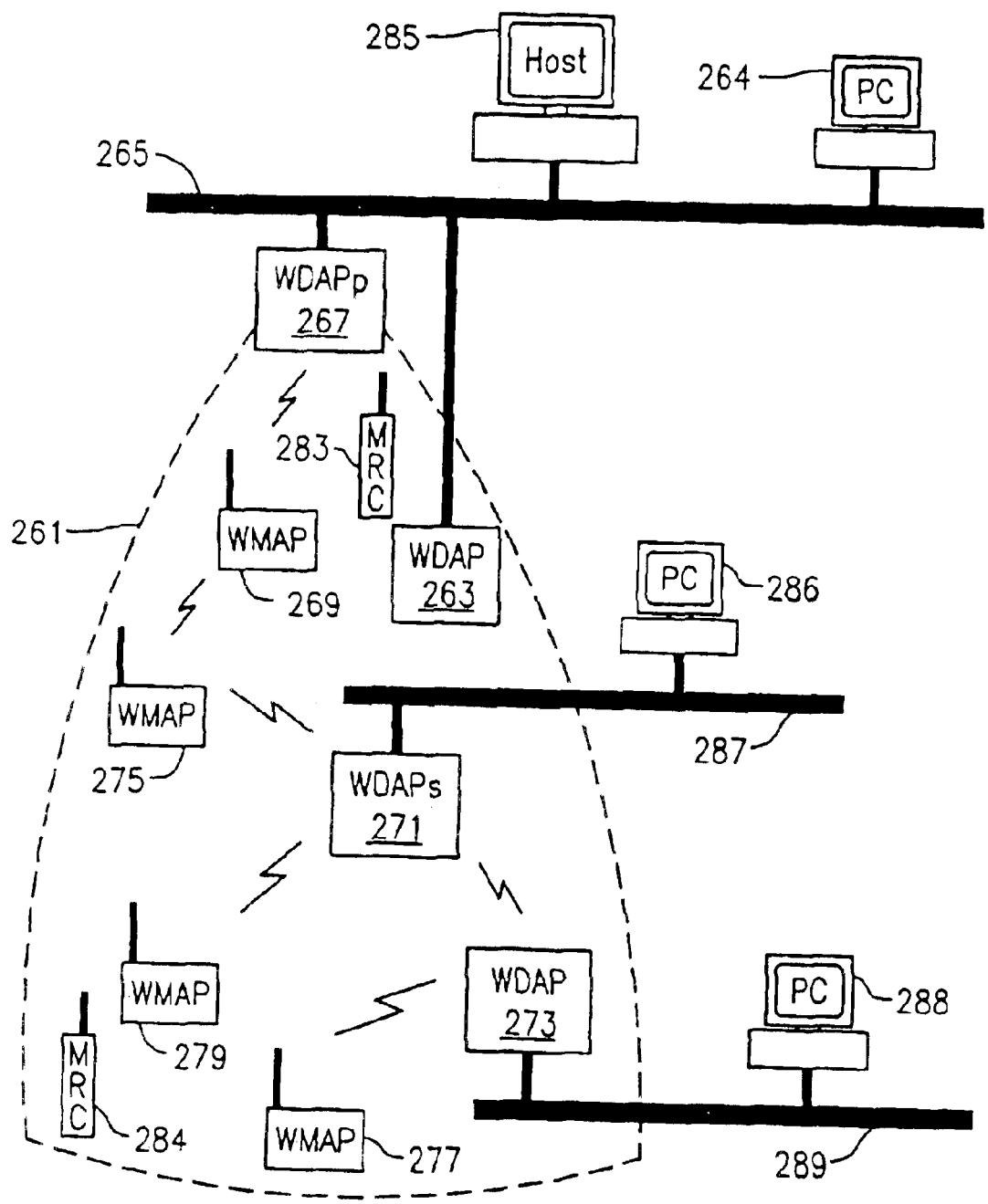
FIG. 7 illustrates an exemplary configuration of the OWL architecture according to one embodiment of the present invention.

FIG. 7 illustrates an exemplary configuration of the OWL architecture according to the present invention. Therein, a wired subnet 265 and remote wired subnets 287 and 289, are configured in accordance with IEEE 802 standards. A WDAPp 267, utilizing the bridging protocol stack shown in FIG. 5, acts as a spanning tree root node, providing access between an OWL radio network 261 and the wired subnet 265. Note that a WDAPd 263 is also illustrated which uses a bridging protocol stack. The WDAPd 263 could instead be used as the root of the spanning tree (becoming the network WDAPp) should the WDAPp break down. In addition, two exemplary remote stations, a host computer 285 and a personal computer 264, are connected to the wired subnet 265.

A WDAPs 271 constitutes an access point to and from the remote wired subnet 287. Similarly, a WDAPs 273 constitutes an access point to and from the remote wired subnet 289. Both WDAPs's utilize the bridge protocol stack of FIG. 4. Moreover, each remote wired subnet 287 and 289 illustrate the participation of a remote station, a personal computer 286 and 288, respectively. Also, wireless communication devices, such as an MRC 283 and an MRC 284, can move through the OWL radio network 261 while maintaining network connectivity. Any wireless communication device can communicate with any other wireless communication device or with any remote station. Similarly, any remote station can communicate with any other remote station or with any wireless communication device.

A plurality of intermediate wireless access points, i.e., the WMAP's 269, 275, 277 and 279, along with the wired access points, i.e., the WDAP's 267, 263, 271 and 273, providing for communication among any of the remote stations and wireless communication devices. Because WDAP's are wired to corresponding wired subnets, they are referred to herein as a "wired access points" even though WDAP's also participate wirelessly within the OWL radio network. Specifically, the plurality of intermediate wireless access points and the wired access points, together, form a spanning tree which provides for routing through the OWL radio network.

Specifically, nodes in an OWL radio network are organized into a network spanning tree. A WDAPp serves as a root of the spanning tree, while PDU's are routed along branches of the spanning tree. Routing toward the root is referred to herein as "downstream" routing. Routing away from the root is referred to as "upstream" routing. Referring to FIG. 7, the WDAPp 267 constitutes the root of the spanning tree formed within the OWL radio network 261. Communication flowing upstream, away from the WDAPp 267, might include a plurality of relay points along the way to reach a destination. For example, to reach the personal computer 286, data from the personal computer 264 first travels along the wired subnet 265 to the root of the spanning tree, i.e., to the WDAPp 267. The WDAPp 267, using a spanning tree routing table, identifies that the WMAP 269 is the next relay point upstream to the personal computer 286. Therefore, the WDAPp 267 forwards the data upstream to the WMAP 269. Upon receipt, the WMAP 269 similarly identifies the WMAP 275 and forwards the data upstream. In turn, the WMAP 275 forwards the data to the WDAPs 271. Finally, the WDAPs 271 relays the data along the remote wired subnet to the personal computer 286.

A spanning tree, which provides the data pathways throughout the OWL radio network, is stored and maintained by each participant in the OWL radio network. Each network node stores and modifies information which specifies how local communication traffic should flow. Optimal spanning trees assure efficient, adaptive (dynamic) routing of information without looping.

Nodes in the OWL radio network are generally categorized as being attached or unattached to the network spanning tree. Upon initialization of an OWL radio network, only the root node is attached. A single WDAP can be designated to contain the root node, or multiple root candidates can negotiate to determine which node assumes the root status.

Once the root is designated, the WDAP containing the root node, i.e., the WDAPp, begins periodically broadcasting messages offering attachment. These messages are referred to as "HELLO response PDU's". Unattached nodes, i.e., other WDAP's or WMAP's, receiving the Hello response PDU's may attach to the OWL radio network via the WDAPp. With the exception of terminal nodes, each network node that becomes attached also begins periodically transmitting Hello response PDU's. The nodes receiving Hello response PDU's from newly attached nodes may attach to the network via the newly attached nodes. This process continues until all of the network nodes are attached. Moreover, to attach to the network, an "Attach request PDU" must be sent and relayed downstream toward the root node. In response, the root sends an "Attach response PDU" back through the network to confirm the attachment. Upon receiving the Attach request PDU, each network node places an entry in a spanning tree routing table indicating the identity of both the requesting node and the node which last transmitted (relayed) the request. In this manner, routing tables can be constructed and maintained. As described in Appendix B, other types of PDU's, i.e., Registration or Data request PDU's, are also be used to create and modify routing tables.

Using the spanning tree routing table, any network node can determine whether any other network node exists upstream or not. In particular, if an entry exists, the destination node must have previously sent a PDU (possibly the Attach request PDU) through that relay node in a downstream pathway to root node. Thus, if the entry exists, the relay node routes the PDU upstream per routing table instruction toward the destination node. However, if no entry for the destination node exists, the relay node can not determine the location of the destination node. Therefore, the relay node sends the PDU downstream toward the root node. If any node along the downstream pathway identifies the destination node in its routing table, that node relays the PDU upstream toward the destination. More detail regarding this entire procedure can be found in Appendix B, for example at pages 17–22.

Figure 8:
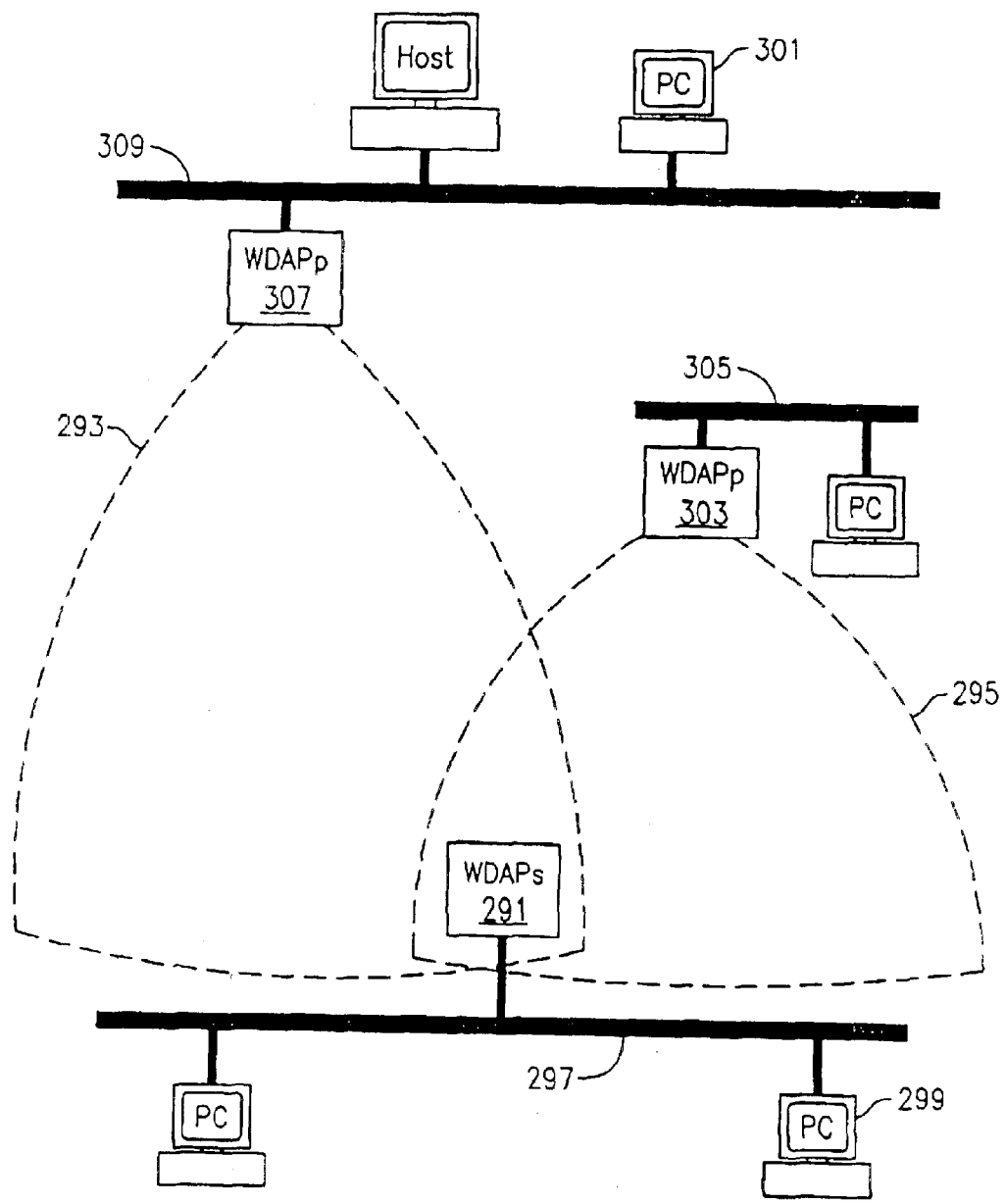
FIG. 8 illustrates an alternate embodiment of the present invention wherein a WDAPs participates in more than one OWL radio network.

FIG. 8 illustrates an alternate embodiment of the present invention wherein a WDAPs 291 participates in more than one OWL radio network. Specifically, the WDAPs 291 participates in OWL radio networks 293 and 295. For example, a personal computer 299 initiates communication to another remote station, a PC 301, by transmitting a message upon a wired subnet 297. Upon receiving the message, the WDAPs 291 checks its routing table and, because no entry is found, routes the message downstream through both the OWL radio networks 293 and 295. When the upstream routing in the OWL network 295 reaches a WDAPp 303, an entry for the personal computer 301 is still not found. Therefore, the WDAPp 303 unicasts the message onto a wired subnet 305. Because the PC 101 does not reside on the subnet 305, the message reaches a dead-end and is ignored. However, when the message reaches a WDAPp 307, and the WDAPp 307 does not find an entry for the personal computer 301, it unicasts the message onto a wireless subnet 309 for receipt by the personal computer 301.

Figure 9:
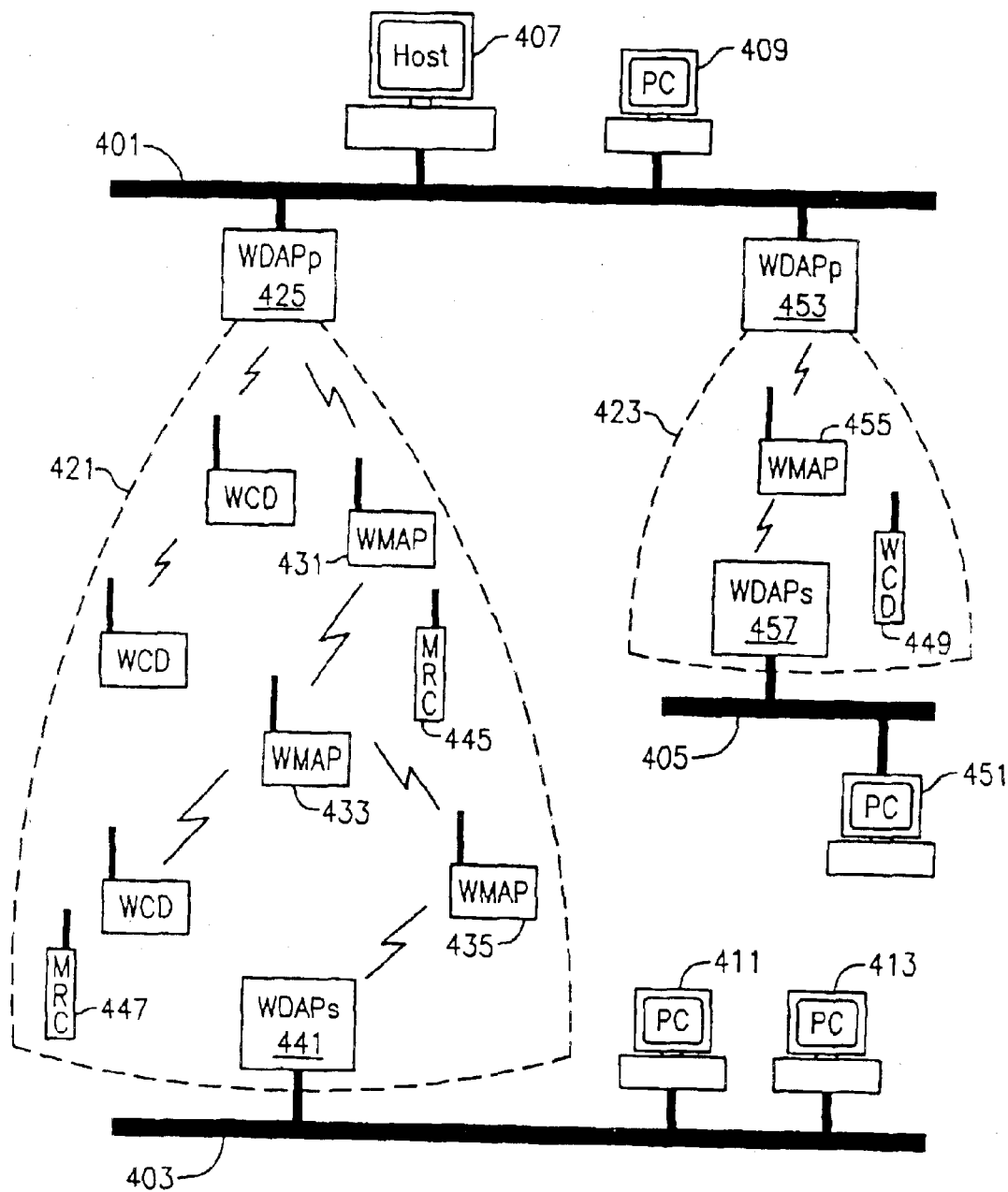
FIG. 9 is a diagram illustrating yet another variation of the OWL architecture according to another embodiment of the present invention wherein two OWL radio networks are used.

FIG. 9 is a diagram illustrating yet another variation of the present invention wherein two. OWL radio networks are used. Specifically, a WDAP 425 provides access for communication between a wired subnet 401 and a remote wired subnet 403. Utilizing a spanning tree configuration, the plurality of intermediate wireless access points, such as WMAP 431, 433 and 435, provide a communication pathway between a WDAPs 441 and the WDAPp 425. Together, the WMAP's, the WDAPp 425 and the WDAPs 441 provide for communication among a plurality of wireless communication devices, such as MRC's 445 and 447, and the remote stations on the subnets 401 and 403, such as a host computer 407 and personal computers 409, 411 and 413.

Similarly, communication interconnectivity is provided via a second OWL radio network 423. The second network 423 provides for communication flow between the wired subnet 401 and a remote wired subnet 405 via a WDAPp 453, WDAPs 457 and a WMAP 455. Again full communication among a wireless communication device 449, a personal computer 451, the host computer 407 and the personal computer 409 is provided for.

Additionally, communication among remote stations on the remote subnets 403 and 405 and wireless communication devices in either network 421 or 423 is provided. For example, the host computer 407 may communicate to the personal computer 413 via the OWL radio network 421. To do so, the host computer 407 first transmits a message destined for the personal computer 413 onto the wired subnet 401. In response, the WDAPp 425 receives the message, identifies a routing table entry for the personal computer 413, and, in one exemplary spanning tree configuration, routes the message up-stream toward the personal computer 413 via a wireless transmission to the WMAP 431. When the WMAP 431 receives the message from the downstream WDAPp 425, the WMAP 431 checks with its routing table. Upon finding a routing table entry for the personal computer 413, the WMAP 431 identifies the WMAP 433 as the next relay point in the pathway to the personal computer 413. Thus, via wireless transmission, the WMAP 433 relays the message to the WMAP 433. Upon receiving the message, the WMAP 433 similarly identifies a routing table entry for the personal computer 413, and routes the message to the WMAP 435. In turn, the WMAP 435 routes the message to the WDAPs 441. The WDAPs 441 finally sends the message to the personal computer 413 via the wired subnet 403. Together, the WDAPp 425, WMAP's 431–435 and WDAPs 441 thus provide a communication pathway between the host computer 407 and the personal computer 413.

As noted previously, each WMAP and each WDAP maintains a spanning tree routing table, i.e., a forwarding database, which specifies how local communication traffic should flow therethrough. Upon receipt of a message, the WMAP or WDAP first identifies the destination of the message. The message destination is then compared with the spanning tree routing table. If an entry in the routing table exists for the message destination, corresponding information regarding the next relay point in the pathway to the message destination is retrieved from the routing table. Such information includes the handle of the next relay point and the communication channel required, for example.

As another example, the personal computer 411 may communicate with the personal computer 451 by utilizing both of the OWL radio networks 421 and 423. Specifically, the personal computer 411 transmits a message to the personal computer 451 on the wired subnet 403. In response, the WDAPs 441 receives the message, recognizes that the personal computer 451 is not within its spanning tree routing table, and routes the message downstream to the WMAP 435. The WMAP 435 receives the message from the WDAPs 441, recognizes that the personal computer 451 is not within its routing table, and thus routes the message to its downstream ancestor, i.e., the WMAP 433. Similarly, upon receiving the message, and, because no entry exists in its routing table, the WMAP 433 forwards the message downstream to its spanning tree ancestor, the WMAP 431. Again, finding no routing table entry for the personal computer 451, the WMAP 431 routes the message to the spanning tree root node, i.e., the WDAPp 425. In turn, finding no routing table entry for the personal computer 451, the WDAPp 425, depending on predetermined program control, may: 1) do nothing, aborting the communication attempt; 2) unicast the message on all ports except the one from which the message was received, i.e., floods the ports with the message; 3) unicast the message on selected ports; or 4) consult a routing control field in the message itself to determine which of the above three options to choose.

Assuming program control permits, the WDAPp 425 unicasts the message intended for the personal computer 451 onto the wired subnet 401. Upon receiving the unicast message, the WDAPp 453 locates the personal computer 451 in its routing table, and routes the message upstream to the WMAP 455. The WMAP 455 similarly identifies a personal computer 451 entry, and routes to the next upstream node, i.e., to a WDAPs 457. Finally, the WDAPs 457, identifying a personal computer 451 routing table entry, sends the message via the remote wired subnet 405 to the personal computer 451.

The illustrated communication network similarly supports communication among wireless communication devices, such as MRC's 445, 447 and 449, and remote stations, such as the host computer 407 and the personal computers 409, 411, 413 and 451.

As previously articulated, further detail regarding the present invention can be found with reference to the Appendices A and B. Appendices A and B have been have been incorporated herein by reference as published in parent Meier U.S. Pat. No. 6,400,702 issued Jun. 4, 2002, at col. 27 through col. 248, and are also available in the file of the present application. Moreover, additional detail may also be found in the patent applications cited above under the heading "Incorporation By Reference". Such applications are incorporated herein by reference in their entirety.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A communication network for exchanging communication packets that have addresses identified therein, said communication network comprising:
   a first subnet;
   a plurality of mobile computing devices each of which having a unique address;
   a plurality of access points utilizing tables indexed by addresses to deliver communication packets along pathways between said plurality of mobile computing devices;
   each of said plurality of access points providing wireless communication with select others of said plurality of access points;
   at least one of said plurality of access points providing direct, hard-wired communication to said first subnet; and
   said plurality of access points dynamically arranging and rearranging the pathways to maintain efficient delivery of communication packets among said plurality of mobile computing devices.

2. The communication network of claim 1 wherein said plurality of mobile computing devices comprising:
at least one mobile terminal that wirelessly communicates with said plurality of access points.

3. The communication network of claim 2 further comprising:
a second subnet:
at least one of said plurality of access points providing direct, hard-wired communication to said second subnet; and
at least a first computing device directly attached to said first subnet, and at least a second computing device directly attached to said second subnet.

4. The communication network of claim 1 wherein said plurality of access points utilize routing and bridging tables indexed by address entries to maintain communication pathways within the communication network.

5. The communication network of claim 1 wherein said plurality of access points utilize spanning tree routing tables indexed by addresses to wirelessly route communication packets between said plurality of mobile computing devices.

6. The communication network of claim 3 wherein said plurality of access points utilize spanning tree routing tables indexed by addresses to wirelessly route communication packets between said first and second computing device.

7. A communication network for exchanging communication packets, each communication packet having a destination field for storing an address of a destination device, comprising:
a first wired subnet;
a plurality of mobile terminal devices, each of said plurality of mobile terminal devices having a unique address associated with said first wired subnet;
a plurality of access points utilizing tables indexed by the unique address of said mobile terminal devices, said tables providing pathway information for delivering communication packets to said plurality of mobile terminal devices;
each of said plurality of mobile terminal devices constructs communication packets with the destination field containing the unique address of a selected other of said plurality of mobile terminal devices;
each of said plurality of access points providing wireless communication with select others of said plurality of access points;
at least one of said plurality of access points providing direct, hard-wired communication to said first subnet; and
said plurality of access points dynamically arranging and rearranging the pathway information in said tables to maintain efficient delivery of communication packets among said plurality of mobile terminal devices.

8. The communication network of claim 7 wherein at least one terminal device uses a direct, serial communication link to exchange communication through said first wired subnet.

9. The communication network of claim 7 wherein said plurality of access points utilize spanning tree routing tables indexed by addresses to wirelessly route communication packets between said plurality of mobile terminal devices.

10. The communication device of claim 7 with said plurality of mobile terminal devices comprising:
at least one mobile terminal that wirelessly communicates with said plurality of access points; and
at least one computing device that communicates using a hard-wired link to the first wired subnet.

11. The communication network of claim 7 further comprising:
a second wired subnet:
at least one of said plurality of access points providing direct, hard-wired communication to said second wired subnet; and
at least one terminal device directly attached to second wired subnet.

12. The communication network of claim 11 wherein at least one of said plurality of mobile terminal devices comprising a mobile terminal that wirelessly communicates via said plurality of access points.

13. A communication network for exchanging communication packets, each communication packet having a destination field for storing an address of a destination device, comprising:
a plurality of wired subnets;
a plurality of mobile terminal devices, each of said plurality of mobile terminal devices having a unique address associated with said plurality of wired subnets;
a plurality of access points utilizing tables indexed by the unique addresses of said plurality of mobile terminal devices, said tables providing information for delivering communication packets to said plurality of mobile terminal devices;
each of said plurality of mobile terminal devices constructs communication packets with the destination field containing the unique address of a selected other of said plurality of mobile terminal devices;
each of said plurality of access points providing wireless communication with at least one of the other of said plurality of access points;
for each of said plurality of wired subnets, at least one of said plurality of access points providing direct, hard-wired communication thereto; and
said plurality of access points providing communication pathways for exchanging communication packets between said plurality of mobile terminal devices.

14. The communication network of claim 13 wherein said plurality of access points utilize spanning tree routing tables indexed by said unique address to route and bridge communication packets between said plurality of mobile terminal devices.

15. The communication network of claim 14 wherein said plurality of mobile terminal devices comprising at least one mobile terminal that wirelessly communicates via said plurality of access points.

16. The communication network of claim 13 wherein said wired subnets comprising ethernet links.

17. The communication link of claim 13 wherein at least one terminal device uses a direct, serial communication link to exchange communication with one of said plurality of wired subnets.

18. A communication network for exchanging communication packets, each communication packet having a destination field for storing an address of a destination device, comprising:
an ethernet link;
a plurality of mobile terminal devices, each of said plurality of mobile terminal devices having unique ethernet addresses associated with said ethernet link;
a plurality of access points utilizing tables indexed by the unique addresses of said mobile terminal devices, said tables providing pathway information for delivering communication packets to said plurality of mobile terminal devices;

each of said plurality of mobile terminal devices constructs communication packets with the destination field containing the unique address of a selected other of said plurality of mobile terminal devices;

each of said plurality of access points providing wireless communication with select others of said plurality of access points;

at least one of said plurality of access points providing direct, hard-wired communication to said ethernet link; and said plurality of access points dynamically arranging and rearranging the pathway information in said tables to maintain efficient delivery of communication packets among said plurality of mobile terminal devices.

19. The communication network of claim 18 wherein at least one terminal device uses a direct, serial communication link to exchange communication through said first wired subnet.

20. The communication network of claim 18 wherein said plurality of access points utilize spanning tree routing tables indexed by addresses to wirelessly route communication packets between said plurality of mobile terminal devices.

21. The communication device of claim 18 with said plurality of mobile terminal device comprising:

at least one mobile terminal that wirelessly communicates with said plurality of access points; and at least one computing device that communicates using a hard-wired link to said ethernet link.

22. The communication network of claim 18 further comprising:

a wired subnet;

at least one of said plurality of access points providing direct, hard-wired communication to said wired subnet; and at least one terminal device directly attached to said wired subnet.

23. The communication network of claim 22 wherein at least one of said plurality of mobile terminal devices comprising a mobile terminal that wirelessly communicates via said plurality of access points.

* * * * *